(12) United States Patent
Lavalle

(10) Patent No.: US 7,845,089 B1
(45) Date of Patent: Dec. 7, 2010

(54) ELECTRICAL FIXTURE FOR FACILITATING THE LOCATION OF A CORRESPONDING OPENING IN A CONSTRUCTION PANEL

(76) Inventor: Stephen T. Lavalle, P.O. Box 114, Bellport, NY (US) 11713

( * ) Notice: Subject to any disclaimer, the term of this patent is extended or adjusted under 35 U.S.C. 154(b) by 0 days.

(21) Appl. No.: 12/386,078

(22) Filed: Apr. 14, 2009

(51) Int. Cl.
*G01B 1/00* (2006.01)
(52) U.S. Cl. ................................. 33/528; 33/DIG. 10
(58) Field of Classification Search ............... 33/528, 33/526, 562–563, DIG. 1, DIG. 10
See application file for complete search history.

(56) References Cited

U.S. PATENT DOCUMENTS

| | | | | |
|---|---|---|---|---|
| 3,745,664 | A * | 7/1973 | Altseimer | 33/528 |
| 4,059,905 | A | 11/1977 | Wieting | |
| 4,202,388 | A * | 5/1980 | Wieting | 33/528 |
| 4,605,139 | A * | 8/1986 | Dacar | 33/DIG. 10 |
| 4,802,284 | A | 2/1989 | Jackson | |
| RE33,305 | E * | 8/1990 | Thayer | 33/DIG. 10 |
| 5,117,720 | A | 6/1992 | Bussi | |
| 5,351,460 | A | 10/1994 | Small | |
| 6,055,736 | A | 5/2000 | Gaston | |
| 6,403,883 | B1 * | 6/2002 | Morgan et al. | 33/528 |
| 6,479,749 | B1 * | 11/2002 | Vrame | 33/528 |
| 6,511,269 | B1 | 1/2003 | Smasne | |
| 6,683,248 | B2 * | 1/2004 | Vrame et al. | 33/528 |
| 6,708,421 | B1 * | 3/2004 | Crorey | 33/613 |
| 6,750,398 | B1 * | 6/2004 | Richardson | 33/528 |
| 6,857,197 | B2 | 2/2005 | Hicks | |
| 6,867,369 | B2 * | 3/2005 | Wiggins | 33/528 |
| 7,189,928 | B2 * | 3/2007 | Denier | 174/481 |
| 7,301,099 | B1 * | 11/2007 | Korcz | 33/528 |
| 7,373,730 | B2 * | 5/2008 | Murphy | 33/528 |
| 7,572,978 | B1 * | 8/2009 | Keith, Jr. | 33/528 |
| 7,659,479 | B2 * | 2/2010 | Murphy | 33/528 |
| 7,661,201 | B1 * | 2/2010 | Hordis | 33/528 |
| 2007/0277388 | A1 * | 12/2007 | Murphy | 33/528 |
| 2009/0277029 | A1 * | 11/2009 | Guzallis | 33/528 |
| 2010/0037475 | A1 * | 2/2010 | Guzallis | 33/528 |

* cited by examiner

*Primary Examiner*—Yaritza Guadalupe-McCall
(74) *Attorney, Agent, or Firm*—Richard L. Miller, Registered Patent Agent

(57) ABSTRACT

An electrical fixture for facilitating the location of a corresponding opening in a construction panel. The electrical fixture comprises a housing for mounting to a stationary building structure behind the construction panel and a collar having a back portion that will eventually fit through the corresponding opening made in the construction panel and into the housing. The back portion of the collar can be locked within the housing. A placement jig is removably secured within the housing and has a cylindrical portion extending outwardly from the housing that will extend through a small preliminary opening made in the construction panel, so that the corresponding opening can be made in the construction panel to allow the back portion of the collar to fit therethrough.

17 Claims, 23 Drawing Sheets

ELECTRICAL FIXTURE FOR FACILITATING THE LOCATION OF A CORRESPONDING OPENING IN A CONSTRUCTION PANEL

BACKGROUND OF THE INVENTION

1. Field of the Invention

The present invention relates to a locating device, and more particularly, an electrical fixture for facilitating the location of a corresponding opening in a construction panel.

2. Description of the Prior Art

Numerous innovations for apparatuses for locating electrical boxes access openings have been provided in the prior art that will be described. Even though these innovations may be suitable for the specific individual purposes to which they address, however, they differ from the present invention.

A FIRST EXAMPLE, U.S. Pat. No. 4,059,905, Issued on Nov. 29, 1977, to Wieting teaches an apparatus that includes a locator pin assembly for mounting on the outlet box before the covering member is placed over the box. It includes one or more pins, depending on the type of outlet box, that are attached to and extend perpendicularly from opposite sides of the mounting plate. The pins are sharp on both ends and pierce the covering member when the member is positioned over the box. A template is mounted on the protruding pin or pins to guide a cutting tool as it cuts the access opening for the box. The pin or pins extend different distances on opposite sides of the plate. On one side, the pins extend a relatively short distance for use with relatively thin covering members, such as wood paneling. On the other side, the pins extend a relatively long distance for use with relatively thick covering members, such as wallboard. An extractor is provided to attach the template to the locator pin assembly through the covering member to hold the template in position during the cutting operation and to allow the scrap and locator pin assembly to be removed together through the access opening.

A SECOND EXAMPLE, U.S. Pat. No. 4,802,284, Issued on Feb. 7, 1989, to Jackson teaches a device for accurately cutting away a section of a panel opposite an electrical outlet box. This device employs a locator plate having two sets of pins, each set extending outwardly from opposite sides of the plate. With the locator plate in position, the panel is placed over the plate with one set of pins piercing the panel. The template is then placed in position with holes in the template servicing to guide the pins piercing the panel and bring the template into registration with the open side of the box so that the center of the template coincides with the center of the open side. With the template in position, the marginal edges of the template overlap the edges of the open side. The user can now use a cutting tool to cut the hole tracing a path defined by the marginal edges of the template. An extension plate is provided for a double outlet electrical box.

A THIRD EXAMPLE, U.S. Pat. No. 5,117,720, Issued on Jun. 2, 1992, to Bussi teaches an apparatus for locating utility structures behind construction panels. In the preferred embodiment, the apparatus is realized in the form of a locator element comprising a body portion, an attachment portion, a puncture portion, and an engaging portion having a knurled or textured surface. The body portion has a longitudinal extent with first and second end portions. The attachment portion is provided to the first end portion for attaching to the utility structure, whereas the puncture portion provides to the second end portion for puncturing through the construction panel. The engaging portion on the other hand, is provided for engaging with a tool for removably detaching the locator element from the utility structure. According to the method of the present invention, location of the utility structure is determined using the exposed portion of the locator element which protrudes beyond the construction panel when the construction panel is positioned over the utility structure and in the predetermined mounting position. Thereafter, prior to formation of the access-opening, the locator element is removably detached from the utility structure using the tool. The present invention also provides a hand-holdable tool which has a housing that serves as a utility box template, provides a storage compartment for storing a plurality of locator elements, and further provides one or more gripping sockets for installing and removing locator elements from utility structures.

A FOURTH EXAMPLE, U.S. Pat. No. 5,351,460, Issued on Oct. 4, 1994, to Small teaches a tool for accurately positioning an electrical box on a wall stud in a building. The tool is preferably embodied by a strip of generally rigid material having a set of indentations for positioning the electrical box at any of several locations along a wall stud. The dimensions of the indentations are preferably such that the electrical box will not protrude beyond mounted drywall.

A FIFTH EXAMPLE, U.S. Pat. No. 6,055,736, Issued on May 2, 2000, to Gaston teaches a locator pin device for locating a utility box behind a covering member such as drywall. The device removeably attaches to a utility box and, when attached, positions a locator pin or pins in an outward direction from the utility box. The locator pin or pins have a long shaft and tip that protrude partially or completely through the covering member when the covering member is placed over the utility box. A template may then be used to mark the location of the utility box so that an access opening may be cut in the covering member. The device allows exact location of a utility box behind a covering member.

A SIXTH EXAMPLE, U.S. Pat. No. 6,511,269 B1, Issued on Jan. 28, 2003, to Smasne teaches an apparatus for locating the position of an object behind a panel and protecting the object or any contents therein during the cutting of an aperture in the panel. In particular, the invention discloses an apparatus for locating the position of an electrical outlet or switch box or the like behind a panel and protecting any wires situated in the box during the cutting of an aperture in the panel to reveal the box. The apparatus comprises a base composed of substantially planar front and back surfaces. The edge of the base may extend a distance generally normal to one of the substantially planar front and back surfaces to thereby define a support extension that supports and stabilizes the apparatus when positioned in a box. A locator pin is connected to the base, and extends outwardly from the base for piercing the panel. The invention further discloses a method of cutting an aperture in a panel to reveal an electrical outlet or switch box or the like located behind the panel, comprising the steps of inserting the apparatus into the electrical outlet or switch box such that the locator pin extends out of the box a distance at least the width of the panel; and moving the panel into a desired position and causing the locator pin to protrude through the panel, thereby locating the position of the box behind the panel and protecting any contents therein such as any wires during the cutting of the aperture. Prior to cutting the aperture, the locator pin may be removed to facilitate the cutting. An aperture may be accurately cut in the panel to reveal the box, preferably using a router.

A SEVENTH EXAMPLE, U.S. Pat. No. 6,857,197 B2, Issued on Feb. 22, 2005, to Hicks teaches an electrical box locator for locating at least one electrical box on a stud, which electrical box locator includes a base plate and a pair of fixed stud flanges for engaging the stud; at least one stationary flange provided on the base plate for engaging a first end of an electrical box; and at least one adjustable flange adjustably carried by the base plate for engaging a second end of the electrical box.

It is apparent now that numerous innovations for apparatuses for locating electrical boxes access openings have been provided in the prior art that are adequate for various purposes. However, electrical boxes, when correctly installed, protrude past the framing members a distance equal to the thickness of the wall panel to be installed, i.e., a half inch protrusion accommodates a half inch wall panel. Owing to this, it is not possible to install a wall panel material over an electrical box—until the final cut-out is made, lest the wall panel material protrudes its thickness beyond adjacent panels. This is true for all electrical boxes currently in use, and for all prior-art. Furthermore, the aim of any electrical box with a centering post must be to achieve an accurate cut-out. Unless the desired wall panel can first be placed upon the framing members and, at the same time, against the adjacent wall panels—it is impossible to determine the exact location of the wall panel being installed in relation to the adjacent wall panels. This deficiency is universal with all prior art in that they utilize a locating post on a one piece box.

The instant invention distinguishes itself from all prior art in that, as a two-part box, it allows the installer to fasten the wall panel to the framing members before the final cut-out is made. Only the instant invention allows for dead-on accuracy of the cut-out.

SUMMARY OF THE INVENTION

AN OBJECT of the present invention is to provide an electrical fixture for facilitating the location of a corresponding opening in a construction panel that avoids the disadvantages of the prior art.

ANOTHER OBJECT of the present invention is to provide an electrical fixture for facilitating the location of a corresponding opening in a construction panel that is simple and inexpensive to manufacture.

STILL ANOTHER OBJECT of the present invention is to provide an electrical fixture for facilitating the location of a corresponding opening in a construction panel that is simple to use.

BRIEFLY STATED, STILL YET ANOTHER OBJECT of the present invention is to provide an electrical fixture for facilitating the location of a corresponding opening in a construction panel. The electrical fixture comprises a housing for mounting to a stationary building structure behind the construction panel and a collar having a back portion that will eventually fit through the corresponding opening made in the construction panel and into the housing. The back portion of the collar can be locked within the housing. A placement jig is removably secured within the housing and has a cylindrical portion extending outwardly from the housing that will extend through a small preliminary opening made in the construction panel, so that the corresponding opening can be made in the construction panel to allow the back portion of the collar to fit there through.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING

Figure 1:
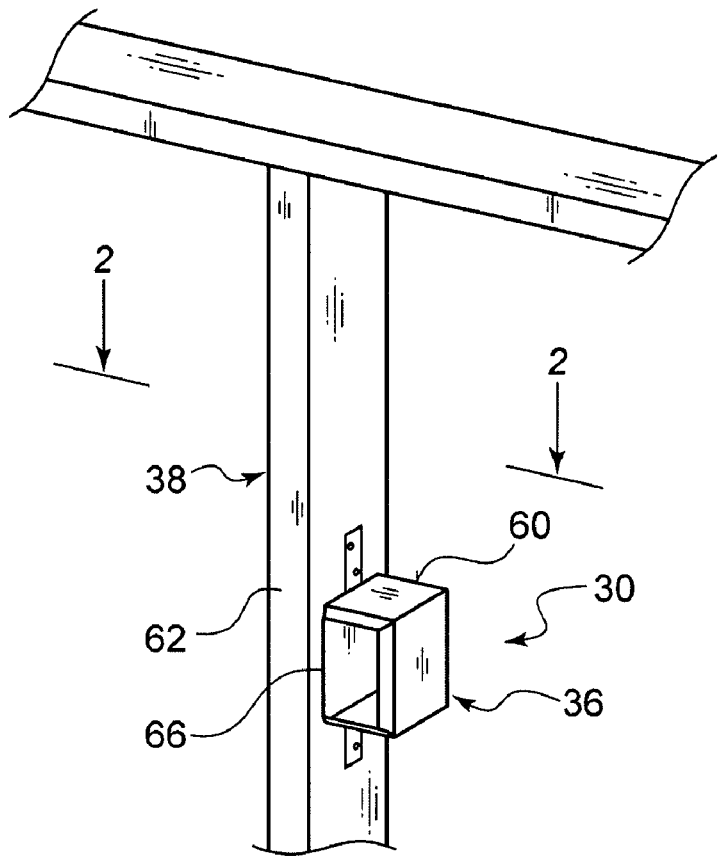
FIG. 1 is a diagrammatic perspective view of a housing being a junction box of a first embodiment of the present invention mounted to a wall stud.
Figure 2:
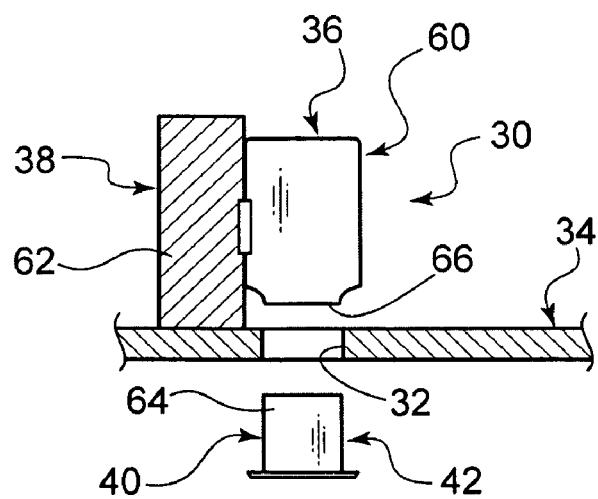
FIG. 2 is a diagrammatic top cross sectional view taken in the direction of line 2-2 of FIG. 1, with a construction panel in place and a corresponding opening cut therethrough for insertion of a cooperating collar of the first embodiment.
Figure 3:
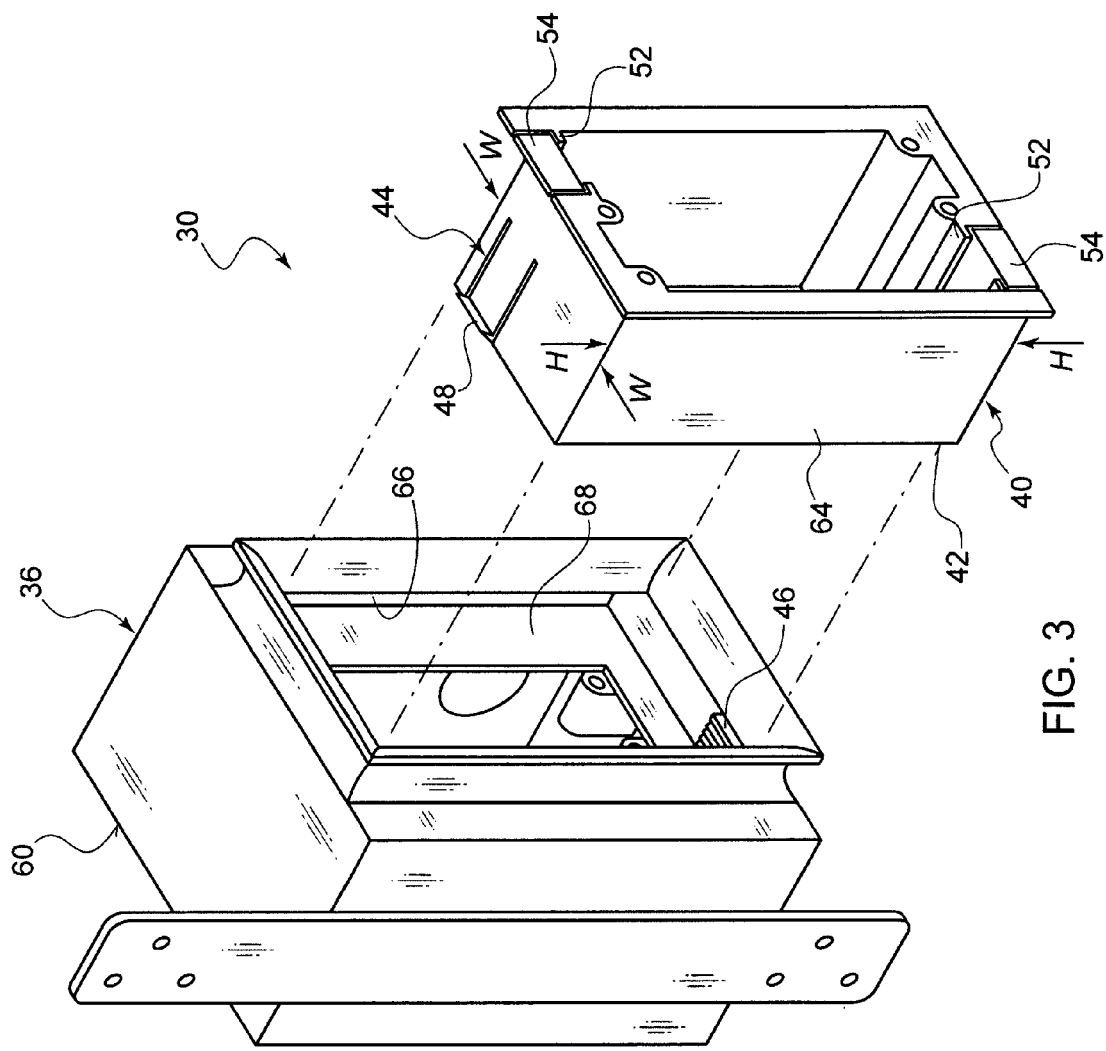
FIG. 3 is an exploded enlarged diagrammatic perspective view showing the cooperation between the housing and the collar, but with the construction panel removed therefrom.
Figure 4:
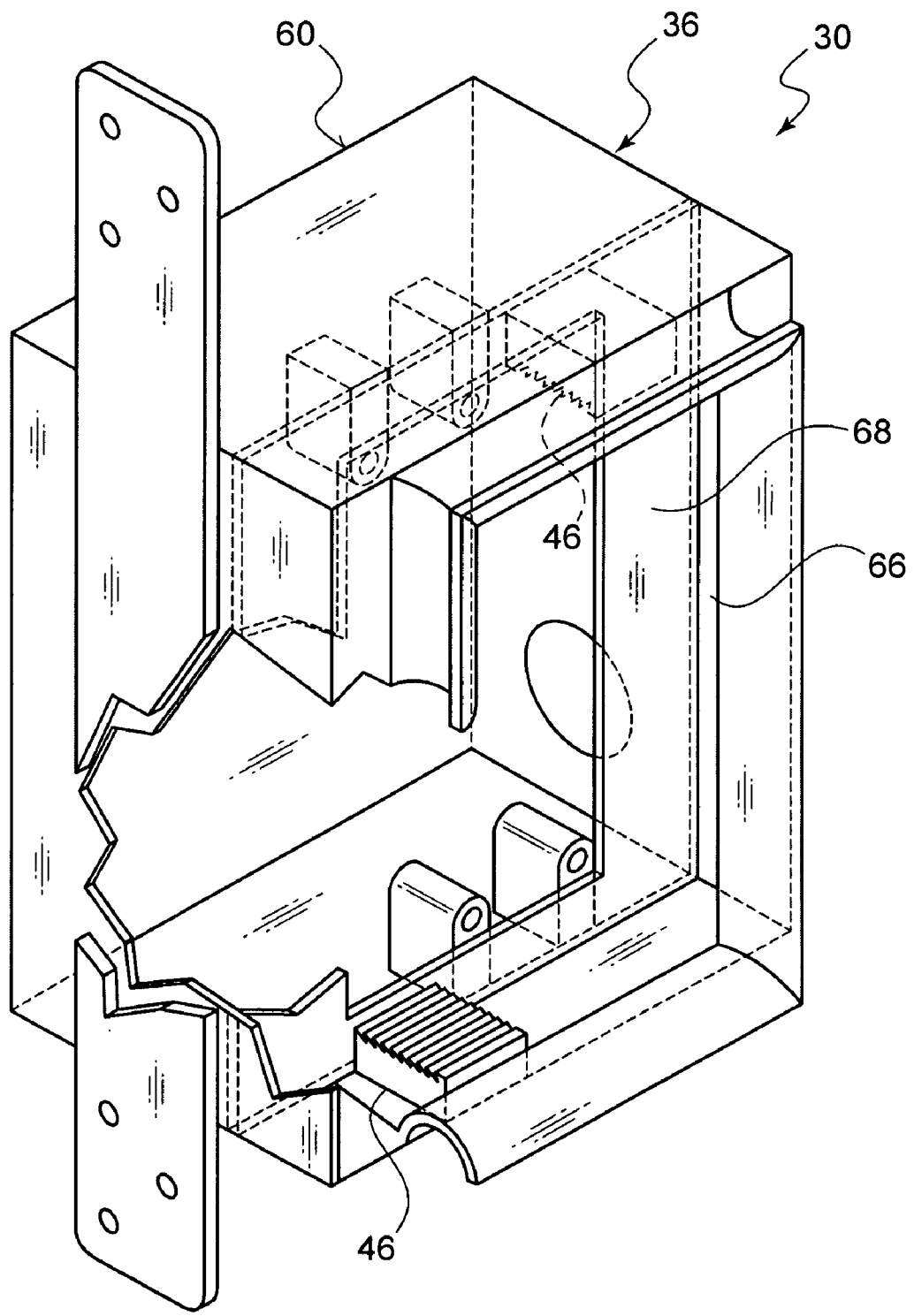
FIG. 4 is a still further enlarged diagrammatic perspective view, with parts broken away, of the housing, showing the interior structure in greater detail.

First Embodiment 30 first electrical fixture
32 corresponding opening
34 construction panel
36 housing of first electrical fixture 30
38 stationary building structure
40 collar of first electrical fixture 30
42 back portion of collar 40
44 locking mechanism of first electrical fixture 30
46 rack member of locking mechanism 44
48 spring biased pawl arm of locking mechanism 44
52 track assembly of locking mechanism 44
54 L-shaped lever arm of locking mechanism 44
56 placement jig of first electrical fixture 30
58 cylindrical portion of placement jig 56
59 removably securing mechanism for placement jig 56
60 junction box for housing 36
62 wall stud for stationary building structure 38
64 box-shaped member for back portion 42
66 front aperture in junction box 60
68 vertical frame-like wall in junction box 60
70 rectangular mounting plate of placement jig 56
72 central internally threaded hub of rectangular mounting plate 70
74 rear surface of rectangular mounting plate 70
76 rear stepped edge of rectangular mounting plate 70
78 reduced externally threaded circular back end of cylindrical portion 58
79 knurled front end of cylindrical portion 58
80 knurled knob of removably securing mechanism 59
82 shaft on knurled knob 80
84 flange member of removably securing mechanism 59
86 first locating template of first electrical fixture 30
88 small preliminary opening in construction panel 34
90 rectangular outline plate of first locating template 86
92 cylindrical aperture in rectangular outline plate 90
94 level vial of first locating template 86
96 front surface of rectangular outline plate 90
98 top edge of rectangular outline plate 90
100 pencil
102 hand saw
104 hole saw
106 screw driver
108 slot in knurled knob 80
110 second locating template of first electrical fixture 30
112 guide plate of second locating template 110
114 central rectangular aperture in guide plate 112
116 bracket of second locating template 110
118 central cylindrical aperture in bracket 116
120 removably holding mechanism of second locating template 110
122 front surface of guide plate 112
124 level vial of second locating template 110
126 top edge of guide plate 112
128 removably retaining mechanism of second locating template 110
130 bracket securement arm of removably holding mechanism 120
132 pivot for bracket securement arm 130
134 knurled knob of removably retaining mechanism 128
136 threaded screw shaft of knurled knob 134
138 electrical component (switch)

Second Embodiment 140 second electrical fixture
142 housing of second electrical fixture 140
144 cylindrical top hat light component for housing 142
146 stationary building structure
148 ceiling joist of stationary building structure 146
150 back portion of collar 152
152 collar of second electrical fixture 140
154 cylindrical shaped member for back portion 150
156 front aperture in cylindrical top hat light component 144
158 back wall of cylindrical top hat light component 144
160 light socket on back wall 58
161 rack member of locking mechanism of second electrical fixture 140
162 placement jig of second electrical fixture 140
163 locking mechanism of second electrical fixture 140
164 cylindrical tubular member of placement jig 162
166 open top end of cylindrical tubular member 164
167 cylindrical portion of placement jig 162
168 bottom end of cylindrical tubular member 164
170 through bore in cylindrical portion 166
172 shaft of hole saw 174
174 hole saw
176 corresponding opening in construction panel 178
178 construction panel
182 male tab of placement jig 162
184 female seat of removably securing mechanism

DETAILED DESCRIPTION OF THE PREFERRED EMBODIMENT

Figure 5:
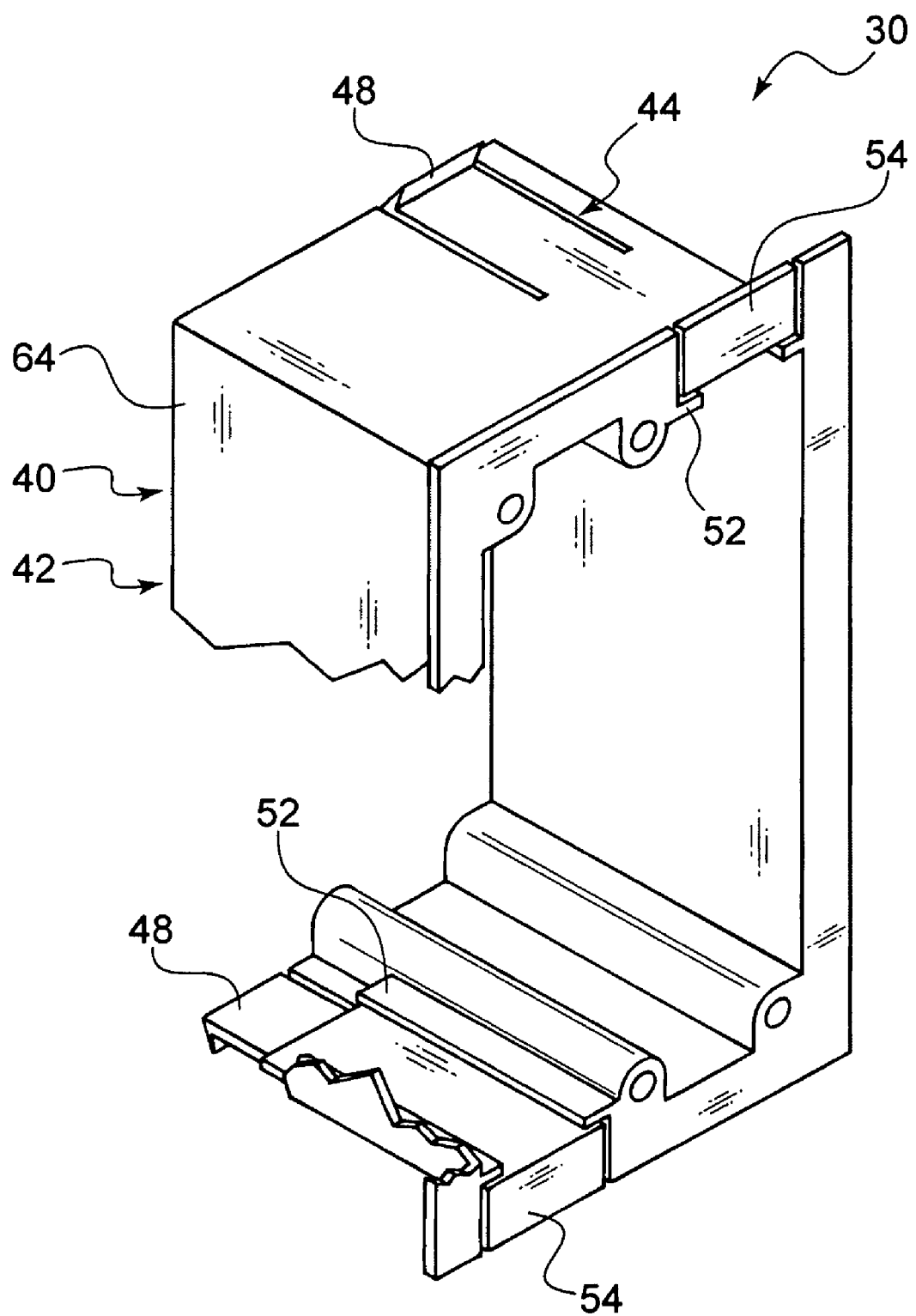
FIG. 5 is a still further enlarged diagrammatic perspective view, with parts broken away, of the collar, showing the interior structure in greater detail.
Figure 6:
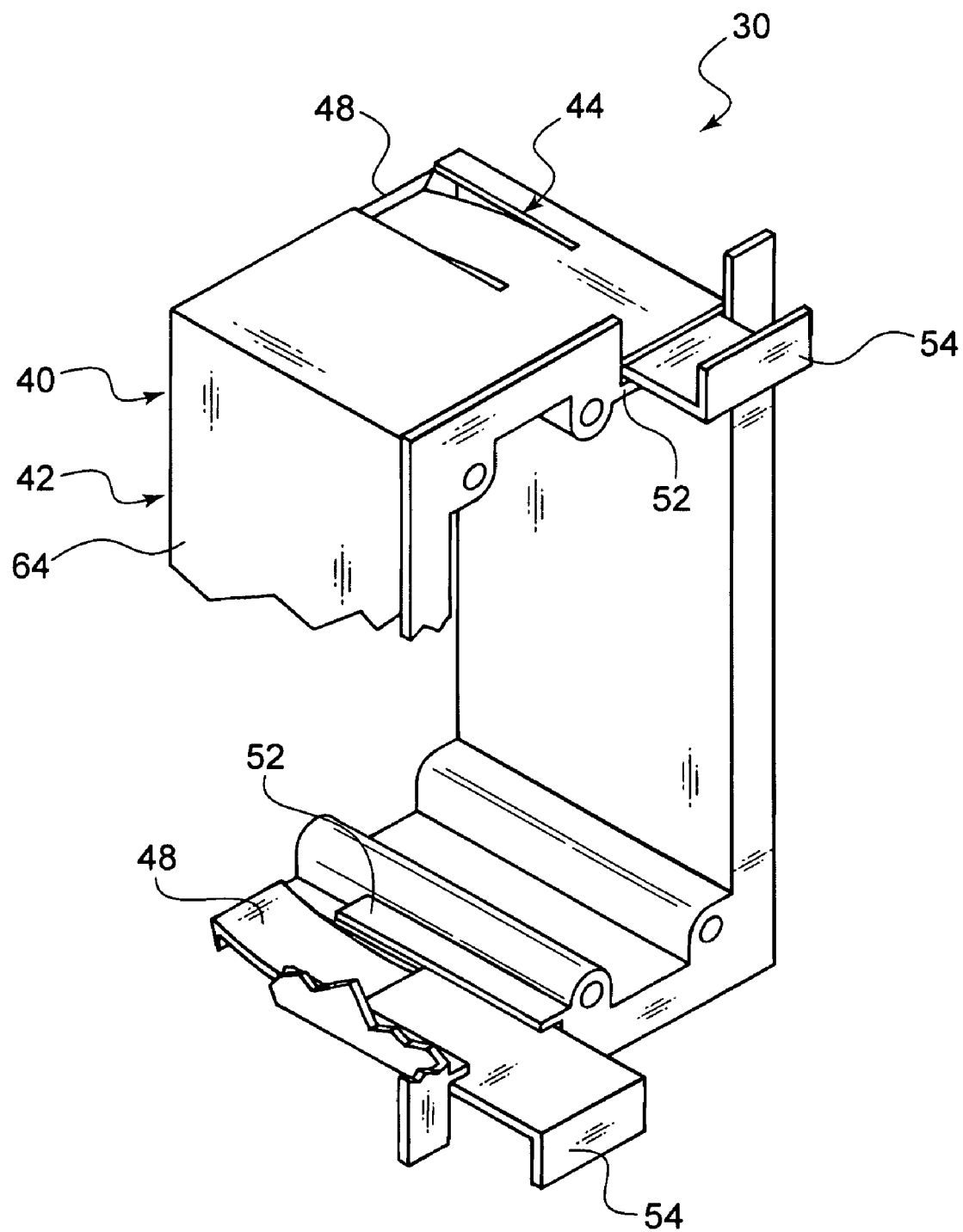
FIG. 6 is a diagrammatic perspective view, similar to FIG. 5, showing the spring biased pawl arms in disengaged positions so that they will not engage the rack members of the cooperating housing to permit removal of the collar therefrom.
Figure 7:
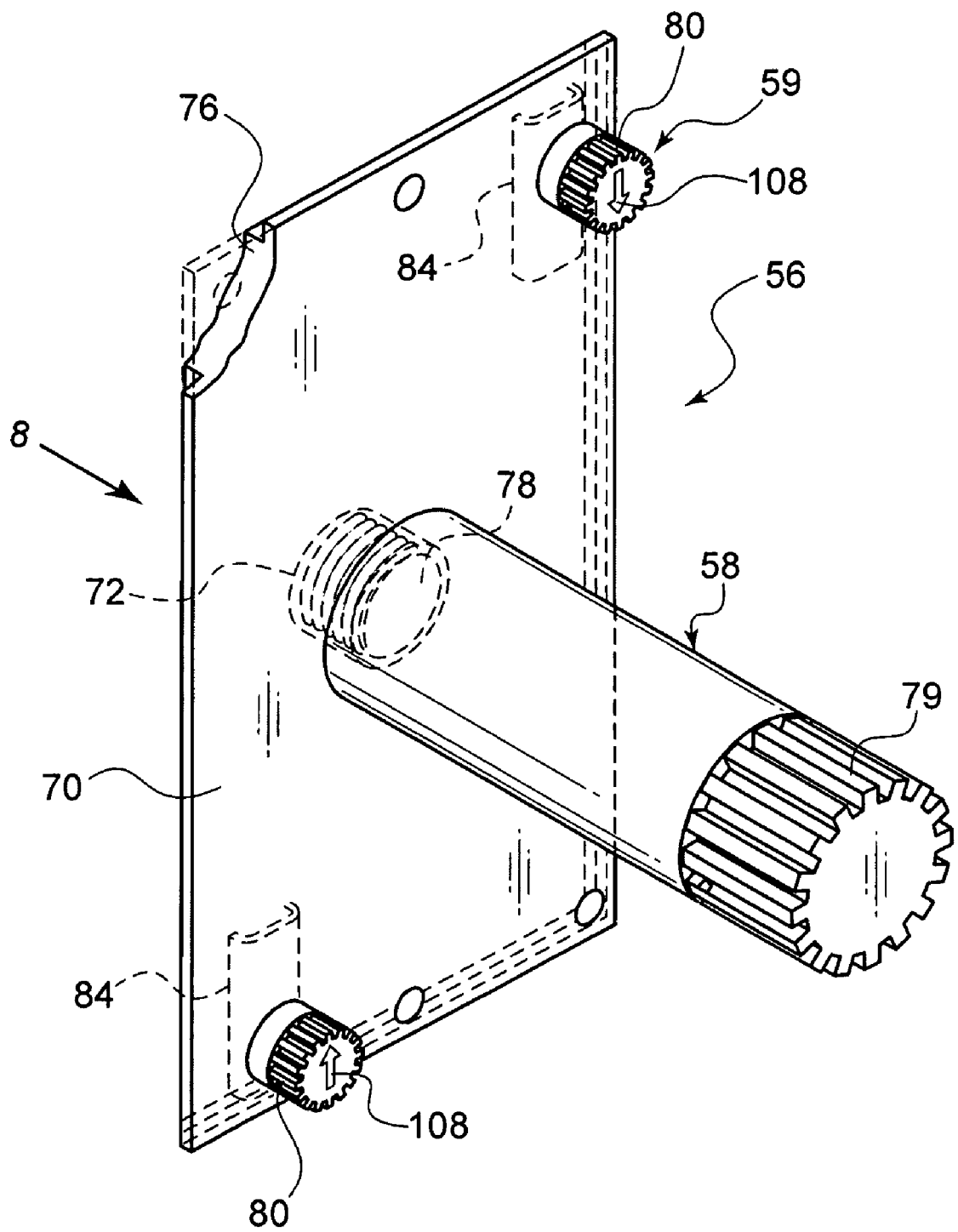
FIG. 7 is a diagrammatic front perspective view, with parts broken away, of a placement jig.
Figure 8:
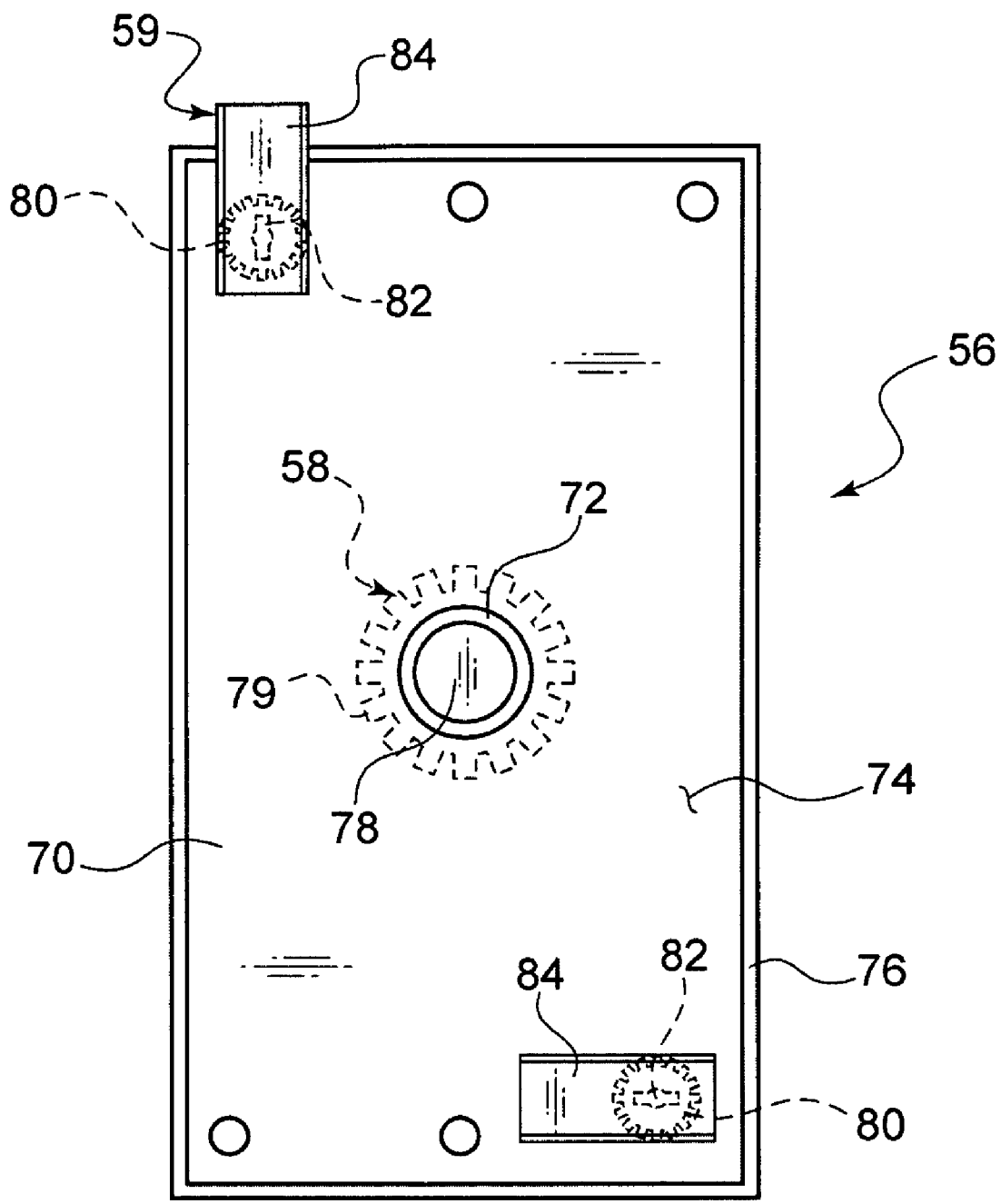
FIG. 8 is a diagrammatic rear elevational view of the placement jig taken in the direction of arrow 8 in FIG. 7.
Figure 9:
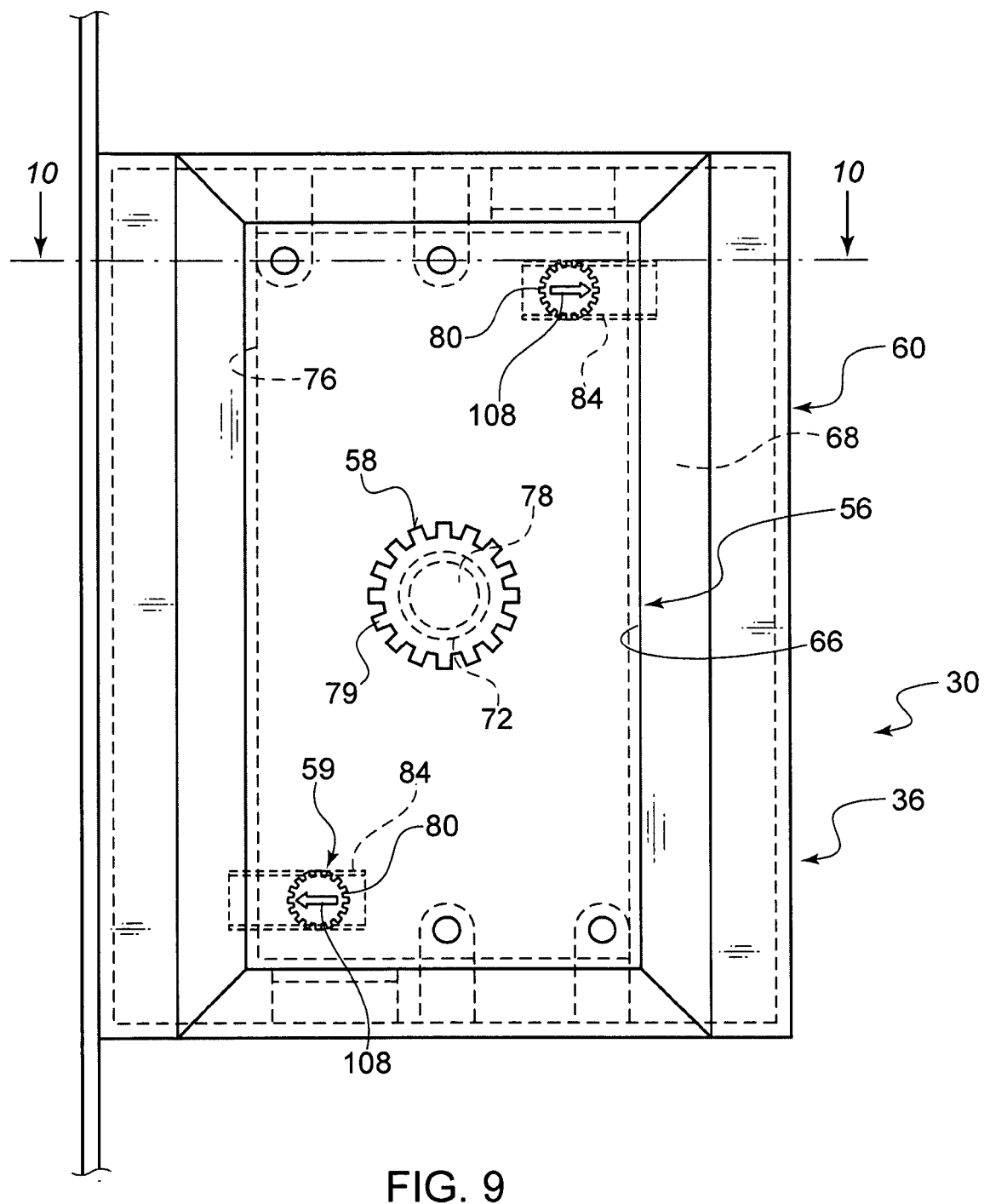
FIG. 9 is a diagrammatic front elevational view of the housing with the placement jig secured therein.
Figure 10:
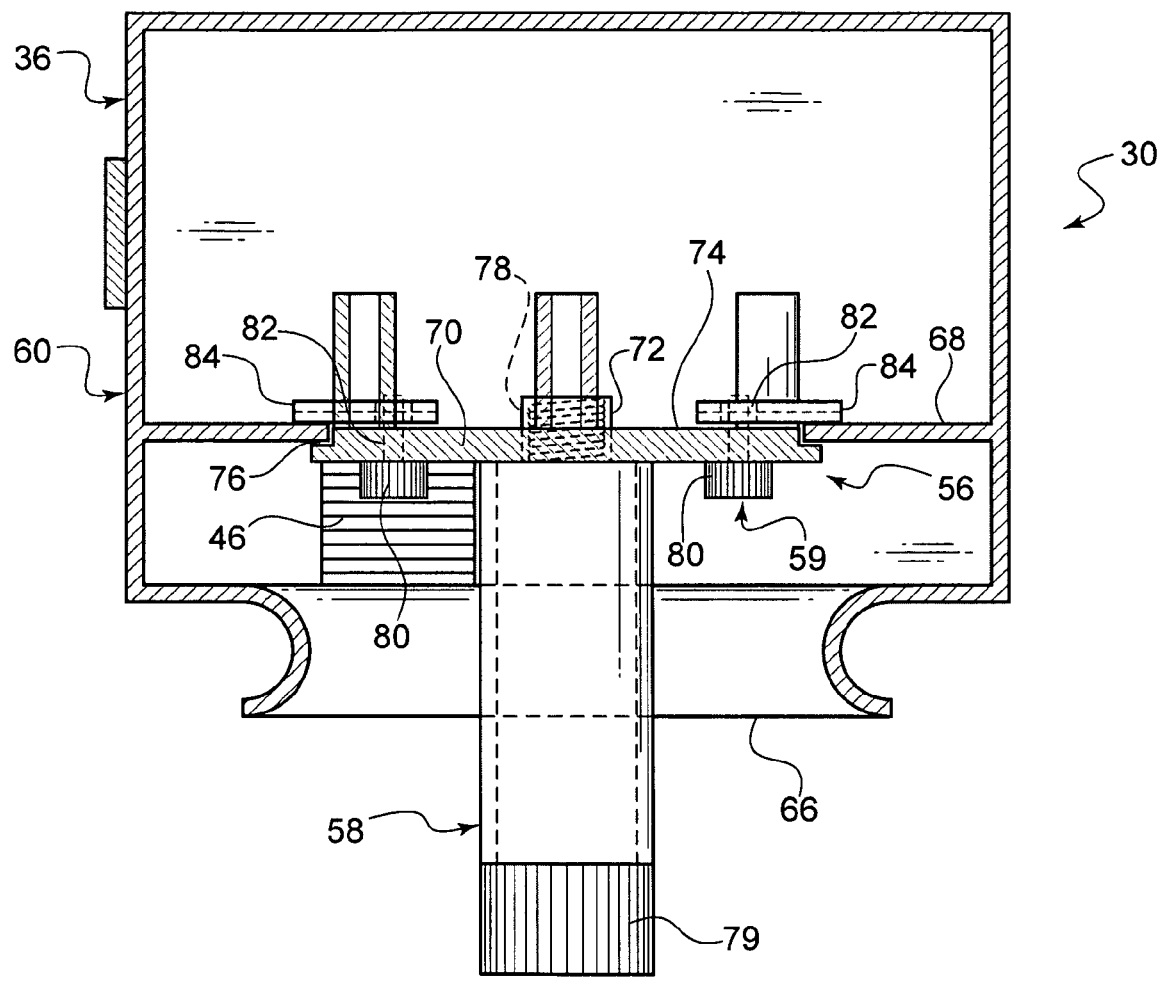
FIG. 10 is a diagrammatic top cross-sectional view taken on line 10-10 of FIG. 9.
Figure 11:
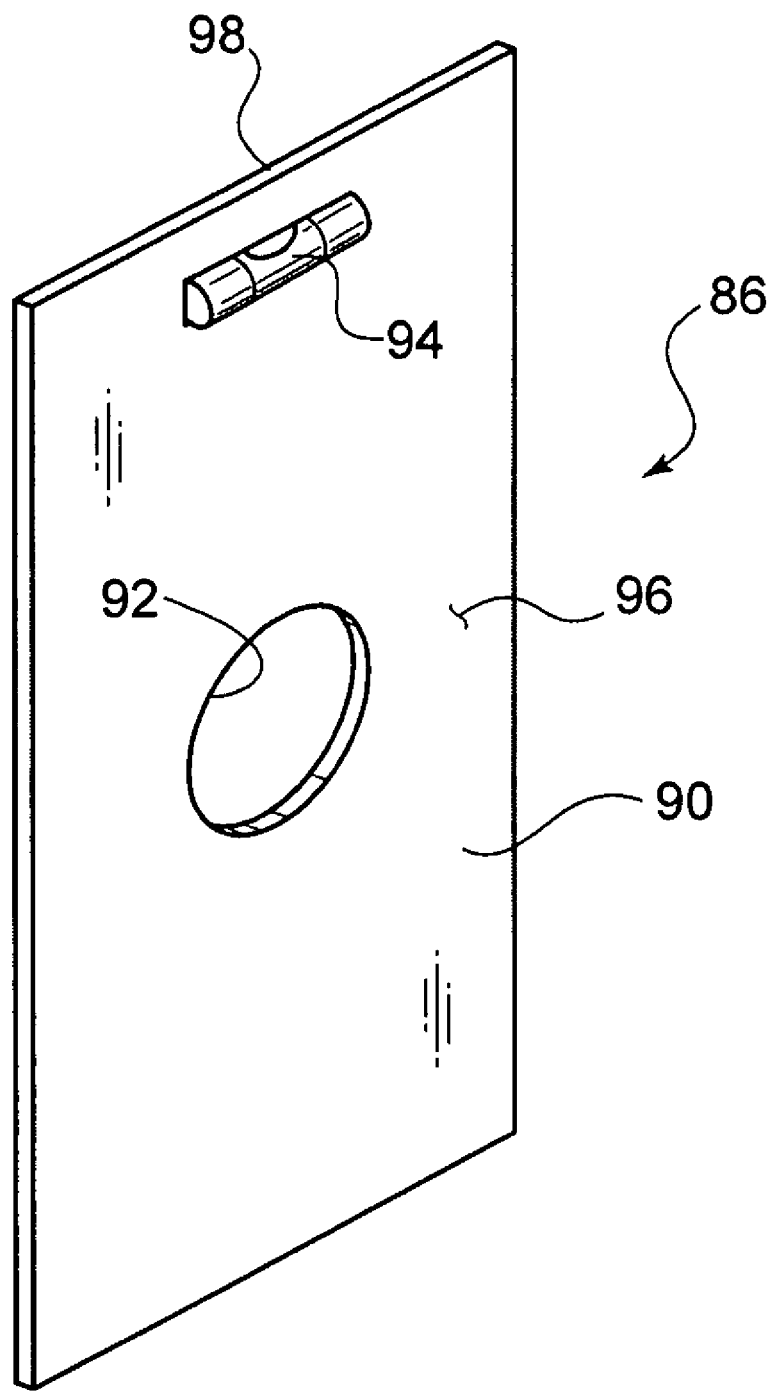
FIG. 11 is a diagrammatic front perspective view of a first type of a locating template which cooperates with the placement jig.
Figure 12:
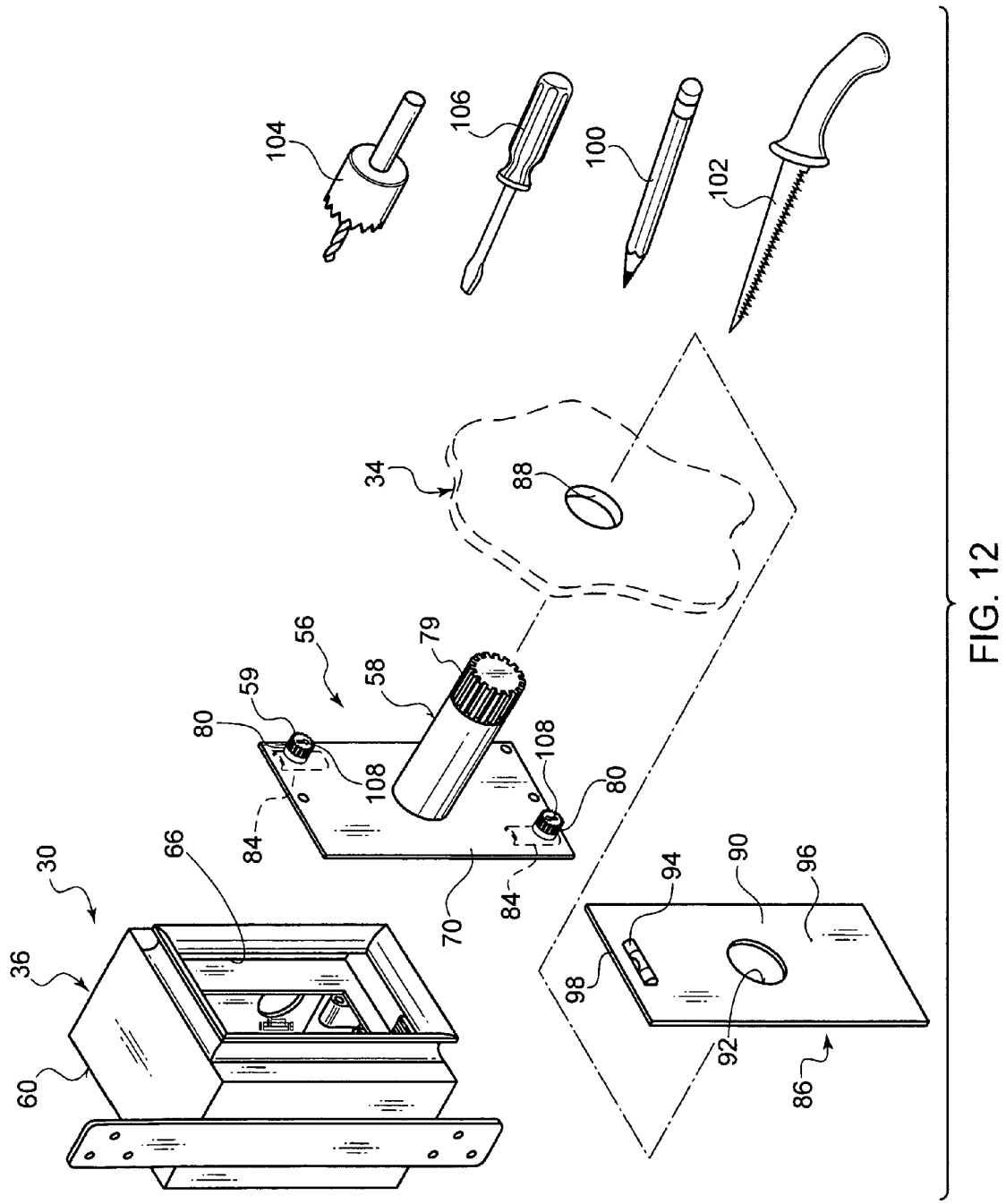
FIG. 12 is an exploded diagrammatic perspective view showing the various components and tools required to conveniently locate and facilitate cutting the corresponding opening in the construction panel.

Referring now to the figures, in which like numerals indicate like parts, and particularly to FIGS. 1 through 12, which are a diagrammatic perspective view of a housing being a junction box of a first embodiment of the present invention mounted to a wall stud; a diagrammatic top cross sectional view taken in the direction of line 2-2 of FIG. 1, with a construction panel in place and a corresponding opening cut therethrough for insertion of a cooperating collar of the first embodiment; an exploded enlarged diagrammatic perspective view showing the cooperation between the housing and the collar, but with the construction panel removed therefrom; a still further enlarged diagrammatic perspective view, with parts broken away, of the housing, showing the interior structure in greater detail; a still further enlarged diagrammatic perspective view, with parts broken away, of the collar, showing the interior structure in greater detail; a diagrammatic perspective view, similar to FIG. 5, showing the spring biased pawl arms in disengaged positions so that they will not engage the rack members of the cooperating housing to permit removal of the collar therefrom; a diagrammatic front perspective view, with parts broken away, of a placement jig; a diagrammatic rear elevational view of the placement jig taken in the direction of arrow 8 in FIG. 7; a diagrammatic front elevational view of the housing with the placement jig secured therein; a diagrammatic top cross-sectional view taken on line 10-10 of FIG. 9; a diagrammatic front perspective view of a first type of a locating template which cooperates with the placement jig; an exploded diagrammatic perspective view showing the various components and tools required to conveniently locate and facilitate cutting the corresponding opening in the construction panel, and as such, will be discussed with reference thereto.

The first embodiment of the present invention is a first electrical fixture 30 for facilitating the location of a corresponding opening 32 in a construction panel 34 which comprises a housing 36 for mounting to a stationary building structure 38 behind the corresponding opening 32 in the construction panel 34. A collar 40 has a back portion 42 which fits through the corresponding opening 32 in the construction panel 34 and into the housing 36.

The first electrical fixture 30 further comprises a mechanism 44 for locking the back portion 42 of the collar 40 within the housing 36. The locking mechanism 44 comprises at least one rack member 46 formed in the housing 36. At least one spring biased pawl arm 48 is integrally formed in the back portion 42 of the collar 40. At least one track assembly 52 is formed on the back portion 42 of the collar 40 over the at least one spring biased pawl arm 48. At least one L-shaped lever arm 54 slides in the at least one track assembly 52 which causes the at least one spring biased pawl arm 48 to engage with and disengage from the at least one rack member 46.

The first electrical fixture 30 further comprises a placement jig 56 having a cylindrical portion 58 extending centrally therefrom. A mechanism 59 is for removably securing the placement jig 56 within the housing 36, wherein the cylindrical portion 58 will extend outwardly from the housing 36.

The housing 36 comprises a junction box 60 which will be mounted to the stationary building structure 38 that is a wall stud 62. The back portion 42 of the collar 40 comprises a box-shaped member 64 that is configured to fit into a front aperture 66 in the junction box 60. The junction box 60 further comprises a vertical frame-like wall 68 formed in a spaced relationship behind the front aperture 66.

The placement jig 56 comprises a rectangular mounting plate 70 having a central internally threaded hub 72 on a rear surface 74 thereof and a rear stepped edge 76 thereabout. The rear stepped edge 76 of the rectangular mounting plate 70 will be placed against the vertical frame-like wall 68 in the junction box 60. The cylindrical portion 58 has a reduced externally threaded circular back end 78 and a knurled front end 79. The reduced externally threaded circular back end 78 threads into the central internally threaded hub 72 of the rectangular mounting plate 70.

The removable securing mechanism 59 comprises a pair of knurled knobs 80. Each knurled knob 80 has a shaft 82 rotatably extending through a top front corner surface and through a bottom front corner surface of the rectangular mounting plate 70 diagonally opposite from each other. A pair of flange members 84 are provided. Each flange member 84 is affixed to a free end of each shaft 82. When the rear stepped edge 76 of the rectangular mounting plate 70 is placed against the vertical frame-like wall 68 in the junction box 60, the knurled knobs 80 will be manually rotated with the two flanges 84 extending behind the vertical frame-like wall 68 to hold the rectangular mounting plate 70 in place thereto.

The first electrical fixture 30 further comprises a first locating template 86 which cooperates with the cylindrical portion 58 of the placement jig 56 extending through a small preliminary opening 88 in the construction panel 34. The first locating template 86 comprises a rectangular outline plate 90 having a central cylindrical aperture 92 therethrough which fits onto the cylindrical portion 58 of the placement jig 56. The rectangular outline plate 90 is of a size that matches the size of the box-shaped member 64 of the back portion 42 of the collar 40. A level vial 94 is mounted parallel in a front surface 96 of the rectangular outline plate 90 near a top edge 98 thereof. The level vial 94 will properly position the rectangular outline plate 90 against the construction panel 34, in which the small preliminary opening 88 in the construction panel 34 will be enlarged to the size of the box-shaped member 64 of the back portion 42 of the collar 40 by marking the rectangular outline plate 90 on the construction panel 34 with a pencil 100 and cutting out the outline on the construction panel 34 with a hand saw 102.

Accordingly the installation of the first electrical fixture 30 can now be finally completed by inserting, through the construction panel 34, the first electrical fixture collar 40, into the front aperture 66 of the housing of the first electrical fixture 36.

A hole saw 104 can be utilized for making the preliminary opening 88 in the construction panel 34, while a screwdriver 106 can be used to engage slots 108 in the knurled knobs 80 to rotate the knurled knobs 80.

Figure 13:
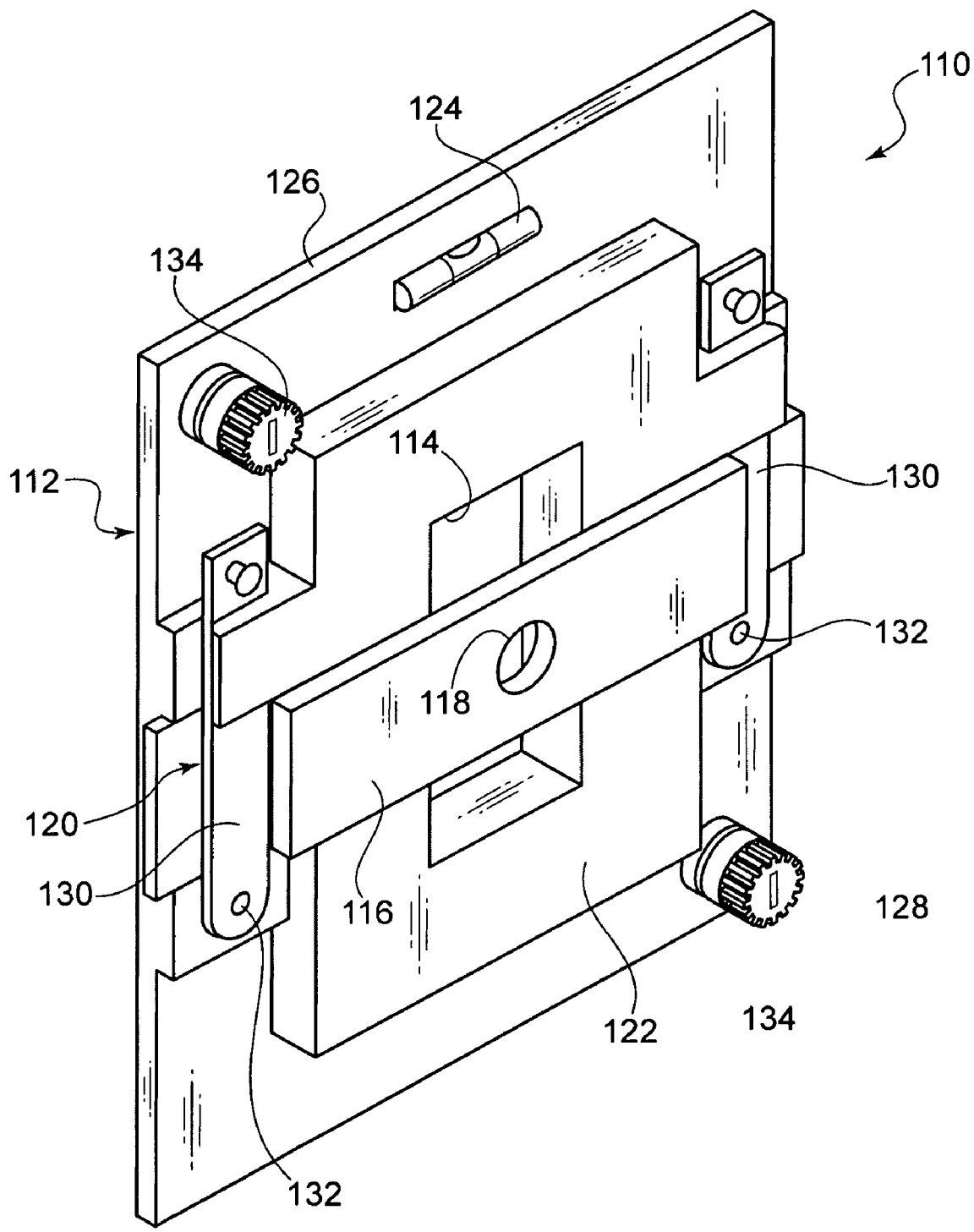
FIG. 13 is a diagrammatic front perspective view of a second type of the locating template which cooperates with the placement jig.
Figure 14:
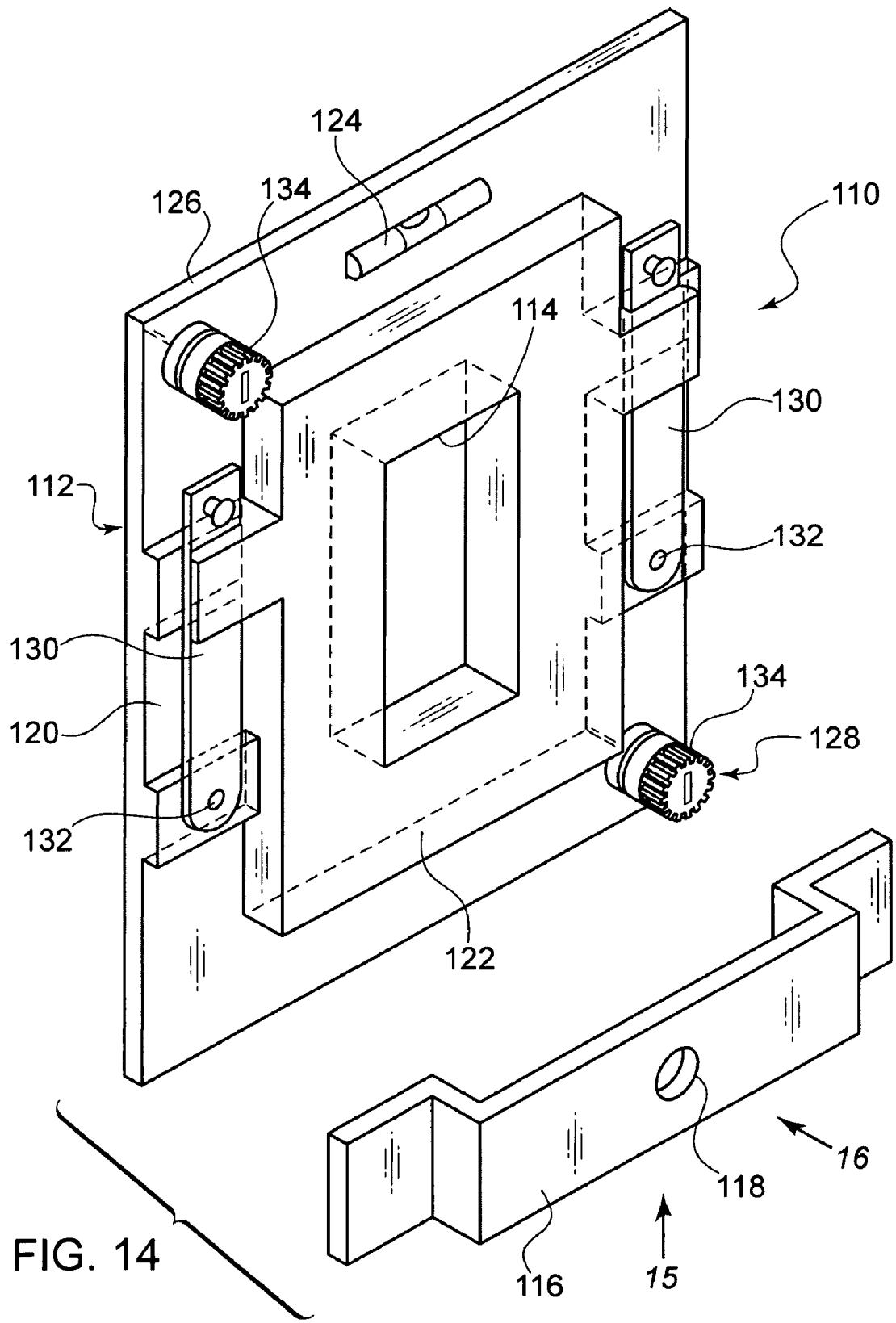
FIG. 14 is a diagrammatic front perspective view, similar to FIG. 13, but with the bracket exploded therefrom.
Figure 15:
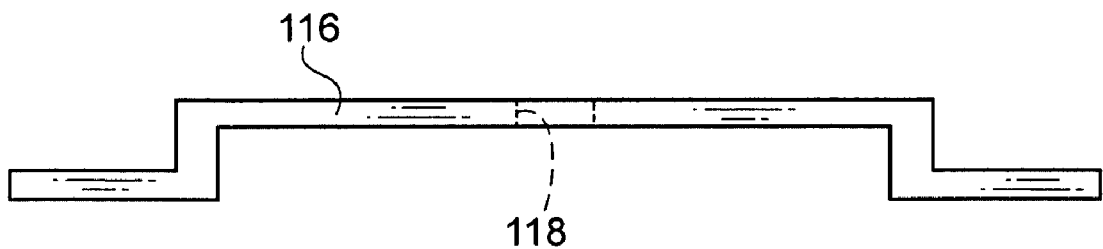
FIG. 15 is a diagrammatic bottom elevational view of the bracket taken in the direction of arrow 15 in FIG. 14.
Figure 16:
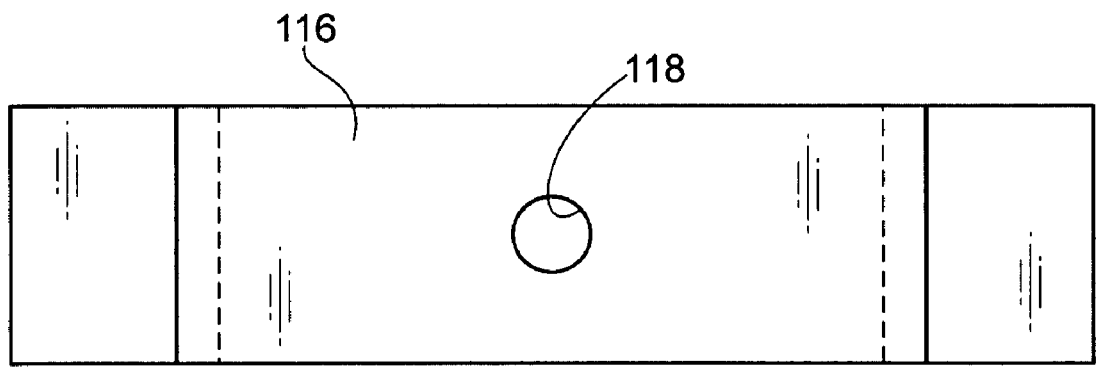
FIG. 16 is a diagrammatic front elevational view of the bracket taken in the direction of arrow 16 in FIG. 14.
Figure 18:
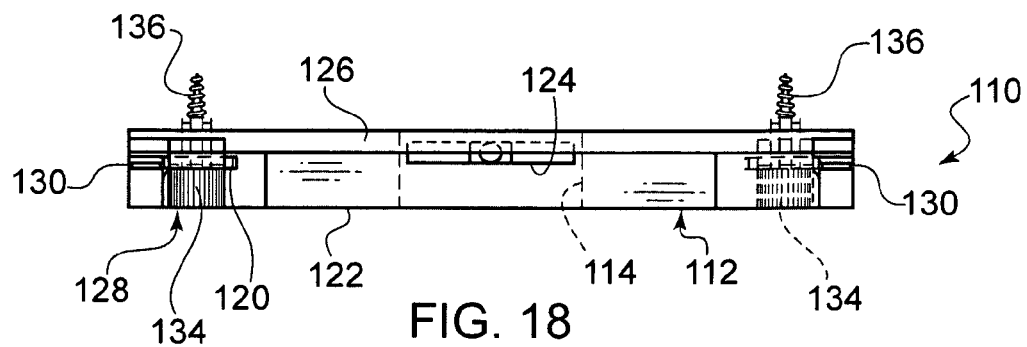
FIG. 18 is a diagrammatic top elevational view of the second type of the locating template taken in the direction of arrow 18 in FIG. 17.
Figure 17:
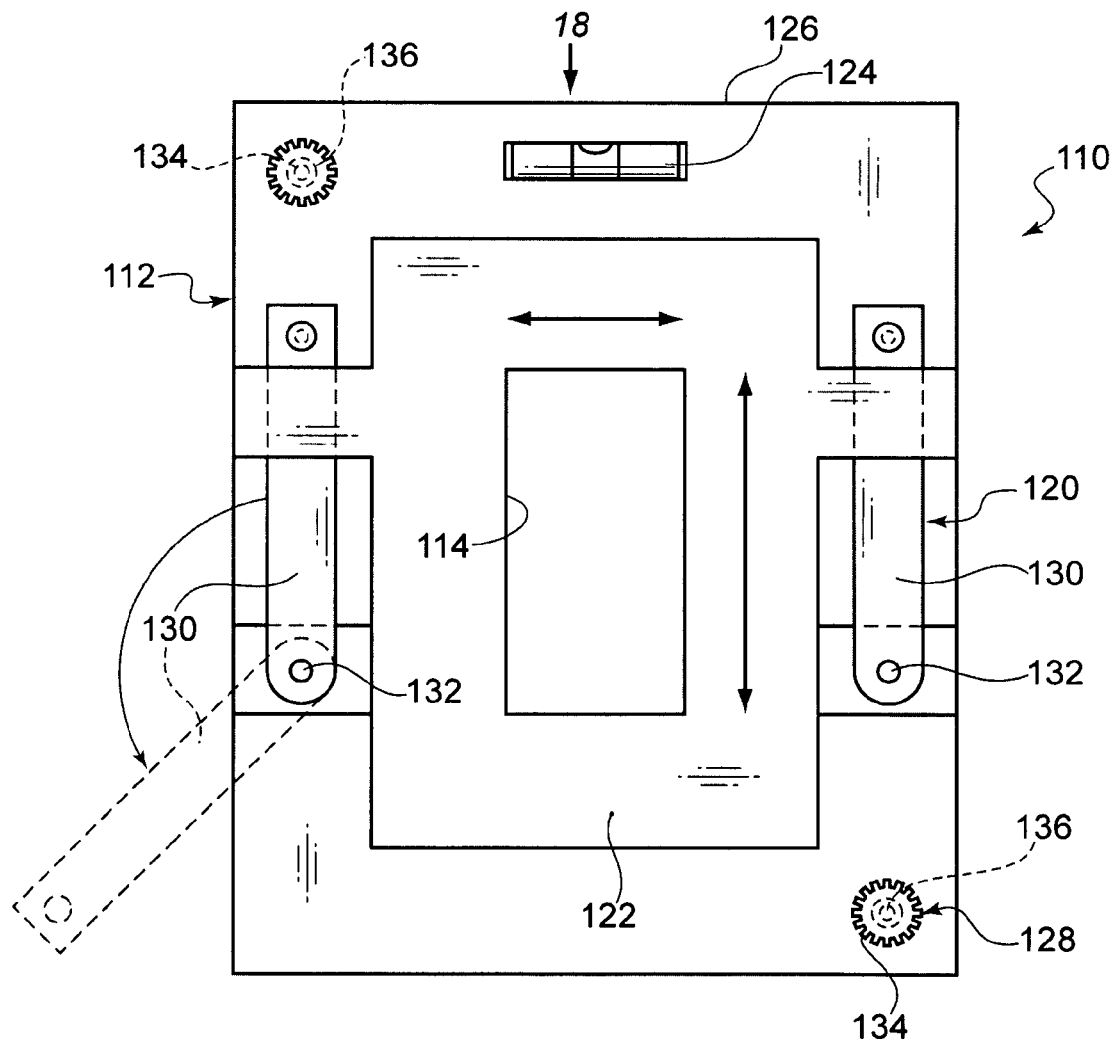
FIG. 17 is a diagrammatic front elevational view of the second type of the locating template, showing in phantom one bracket securement arm in a released position.

FIGS. 13 through 18 are a diagrammatic front perspective view of a second type of the locating template which cooperates with the placement jig; a diagrammatic front perspective view, similar to FIG. 13, but with the bracket exploded therefrom; a diagrammatic bottom elevational view of the bracket taken in the direction of arrow 15 in FIG. 14; a diagrammatic front elevational view of the bracket taken in the direction of arrow 16 in FIG. 14; a diagrammatic front elevational view of the second type of the locating template, showing in phantom one bracket securement arm in a released position; a diagrammatic top elevational view of the second type of the locating template taken in the direction of arrow 18 in FIG. 17, and as such, will be discussed with reference thereto.

A second locating template 110 comprises a guide plate 112 having a central rectangular aperture 114 therethrough, which matches the size of the box-shaped member 64 of the back portion 42 of the collar 40. A bracket 116 has a central cylindrical aperture 118 therethrough which fits onto the cylindrical portion 58 of the placement jig 56. A mechanism 120 is for removably holding the bracket 116 on a front surface 122 of the guide plate 112 and over the central rectangular aperture 114. A level vial 124 is mounted parallel in the front surface 122 of the guide plate 112 near a top edge 126 thereof. The level vial 124 will properly position the guide plate 112 against the construction panel 34. A mechanism 128 is for removably retaining the guide plate 112 in a stationary position against the construction panel 34. When the bracket 116 and the cylindrical portion 58 of the placement jig 56 are removed therefrom, the small preliminary opening 88 in the construction panel 34 will be enlarged to the size of the box-shaped member 64 of the back portion 42 of the collar 40, by cutting out a portion of the construction panel 34 about the central rectangular aperture 114 in the guide plate 112, with a router.

Accordingly the installation of the first electrical fixture 30 also can now be finally completed by inserting, through the construction panel 34, the first electrical fixture collar 40, into the front aperture 66 of the housing of the first electrical fixture 36.

The removably holding mechanism 120 comprises a pair of bracket securement arms 130. Each bracket securement arm 130 is pivotally mounted at 132 on the front surface 122 of the guide plate 112 at one side of the bracket 116. The removably retaining mechanism 128 comprises a pair of knurled knobs 134, each knurled knob 134 has a threaded screw shaft 136 rotatably extending through a top front corner surface and through a bottom front corner surface of the guide plate 112 diagonally opposite from each other. When the knurled knobs 134 are manually rotated the threaded screw shafts 136 will thread into the construction panel 34 to hold the guide plate 112 in place thereto.

Figure 19:
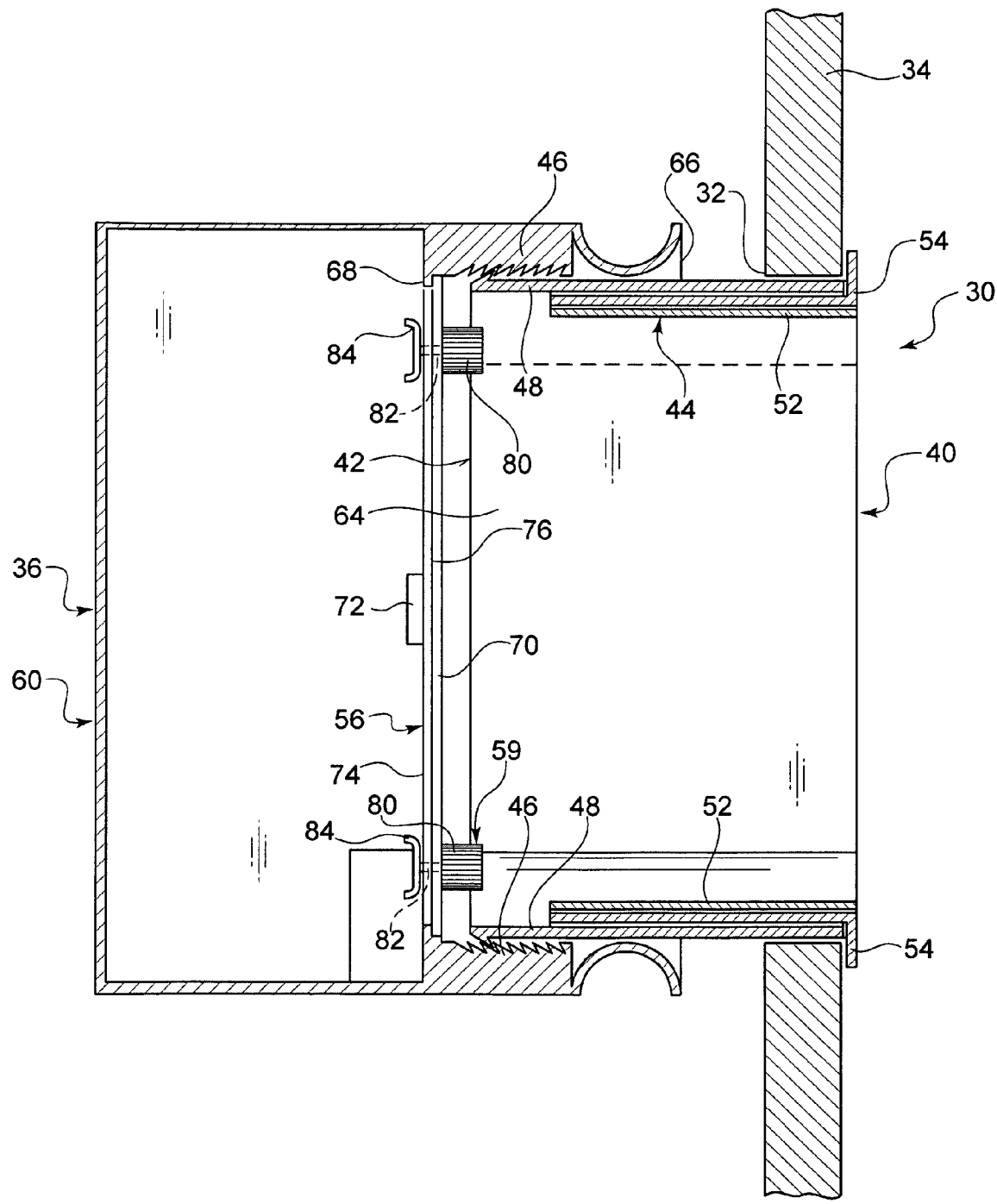
FIG. 19 is a diagrammatic cross-sectional view showing the housing and collar of the first embodiment in an assembled position before an electrical component is installed therein.
Figure 20:
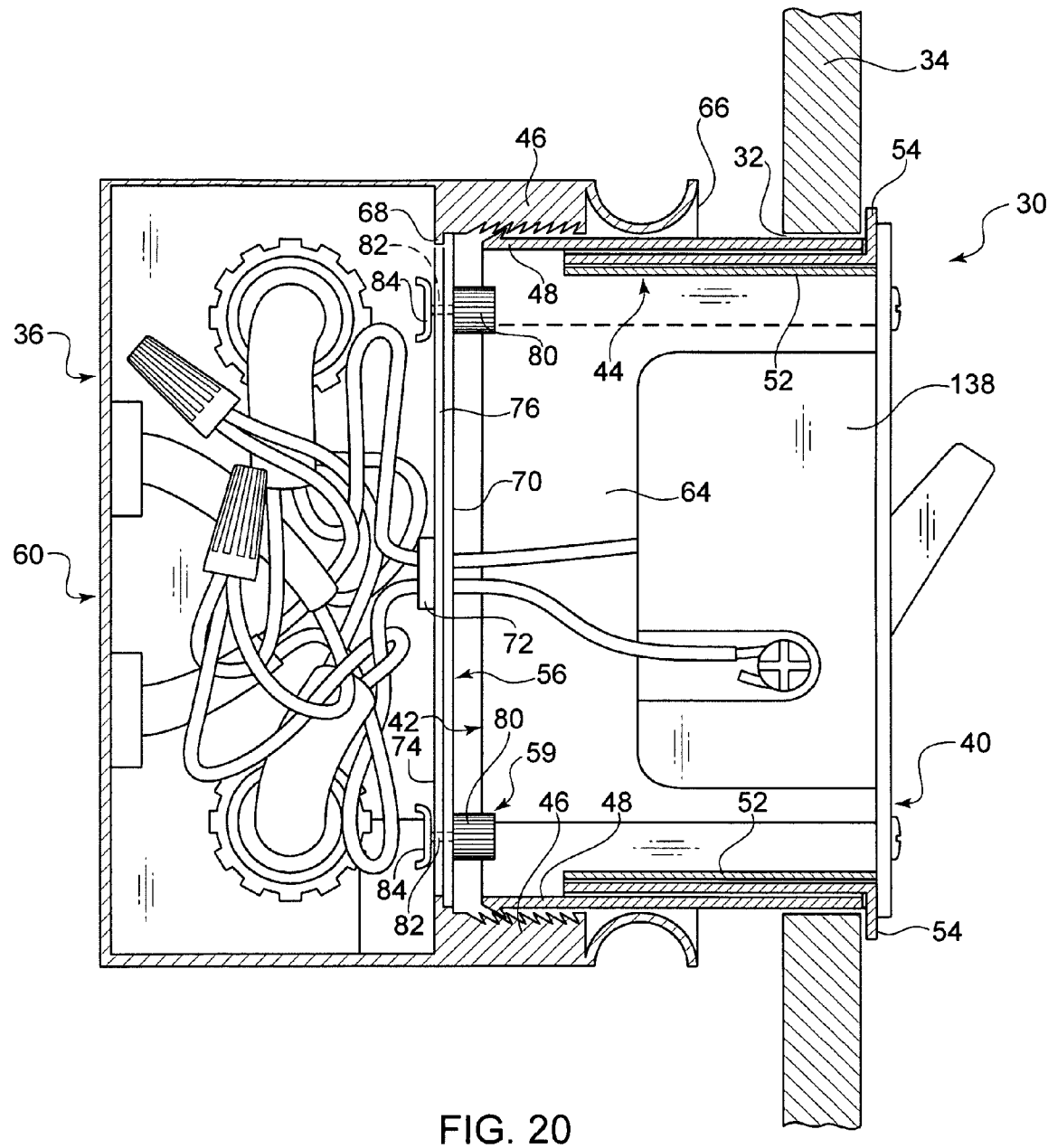
FIG. 20 is a diagrammatic cross-sectional view, similar to FIG. 19, but with the electrical component installed therein.

FIG. 19 is a diagrammatic cross-sectional view showing the housing 36 and collar 40 of the first embodiment in an assembled position before an electrical component is installed therein, while FIG. 20 is a diagrammatic cross-sectional view, similar to FIG. 19, but with the electrical component, such as a switch 138, installed therein. The construction panel 34 can be a wallboard fabricated out of plaster, wood, metal or any other durable material.

Figure 21:
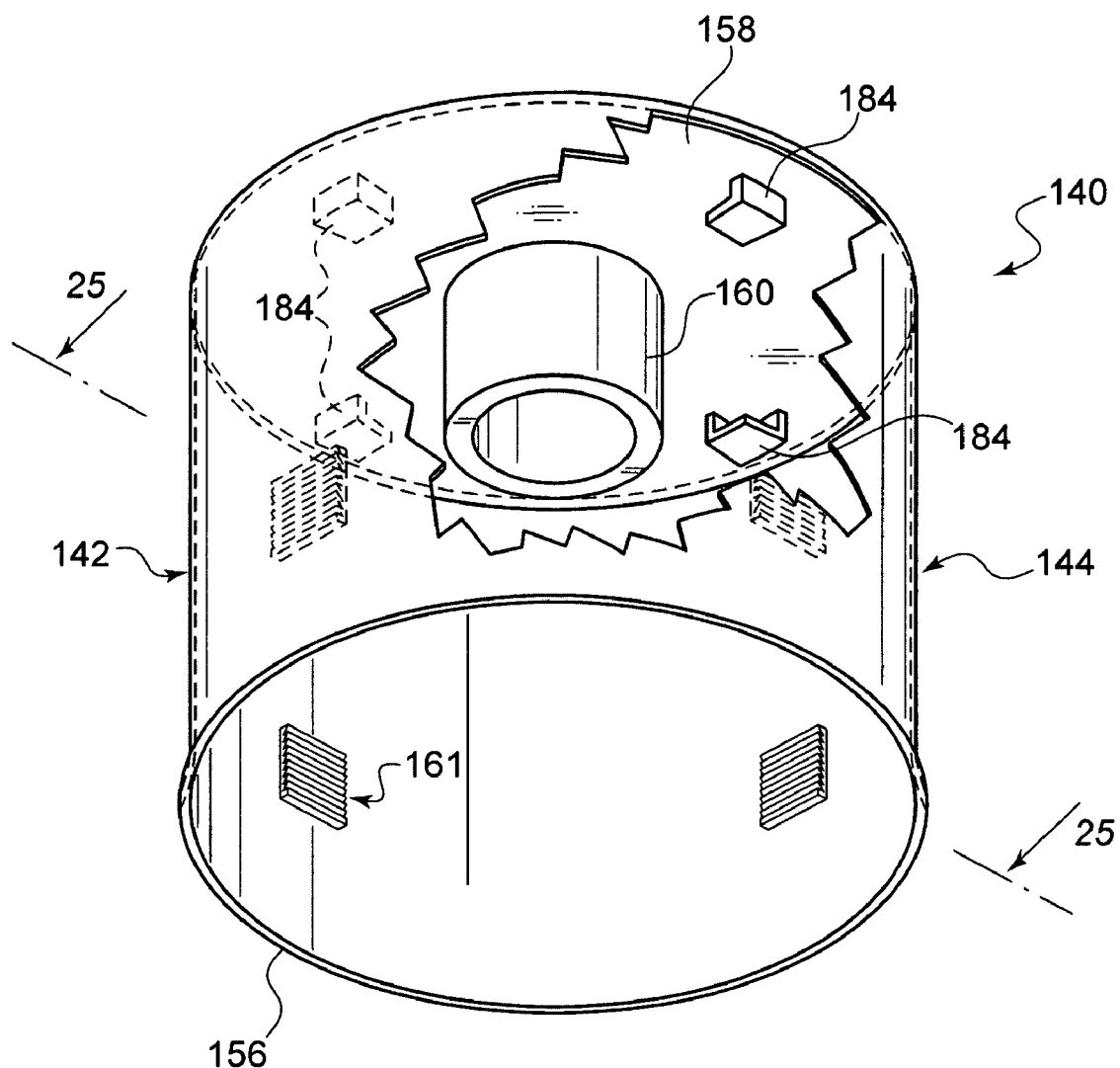
FIG. 21 is a diagrammatic perspective view, with parts broken away, of a housing being a cylindrical top hat light component of a second embodiment of the present invention.
Figure 22:
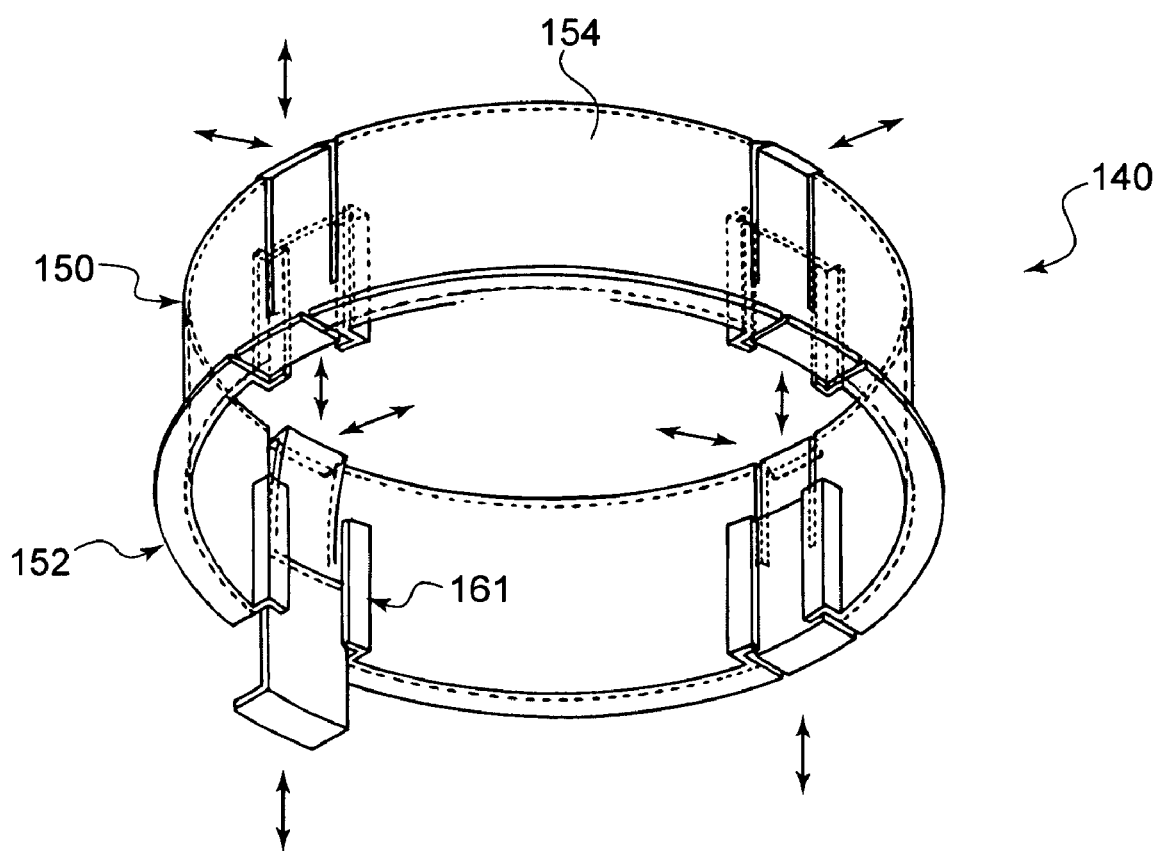
FIG. 22 is a diagrammatic perspective view of a cooperating collar of the second embodiment.
Figure 23:
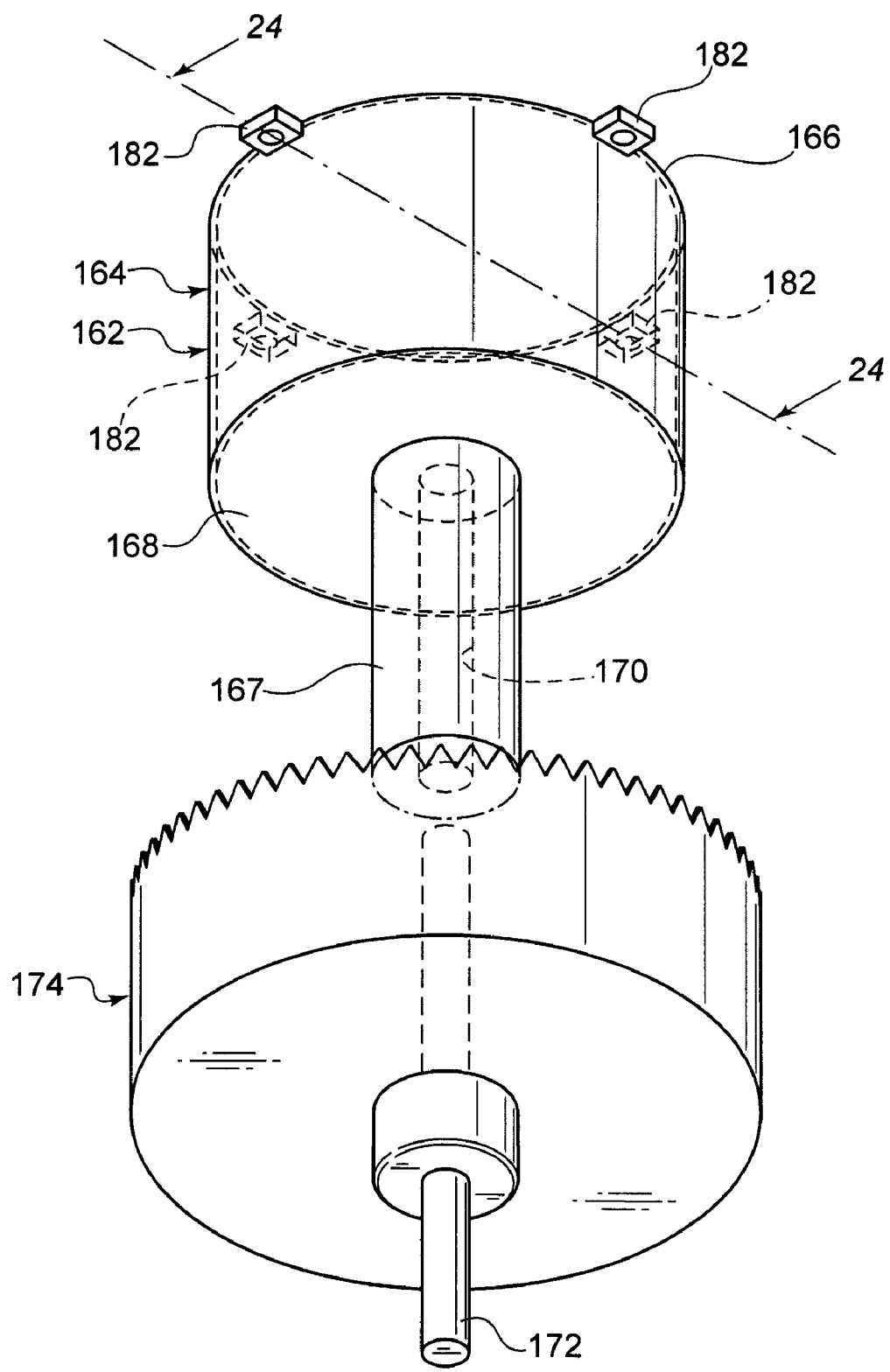
FIG. 23 is a diagrammatic perspective view of a cooperating placement jig for securement in the housing of the second embodiment and a hole saw.
Figure 24:
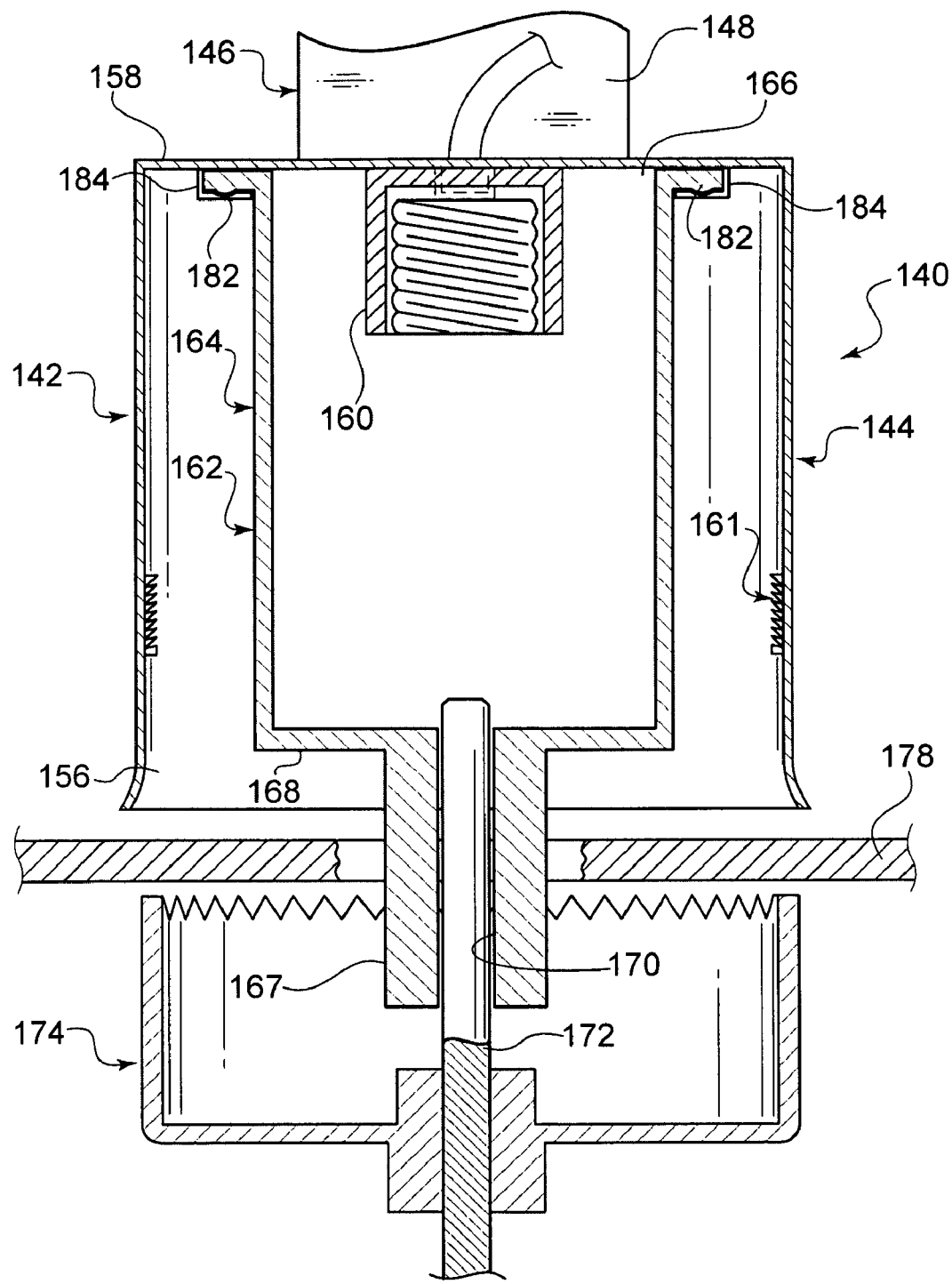
FIG. 24 is a diagrammatic cross-sectional view taken on line 24-24 of FIG. 23, but also showing the housing connected to a typical ceiling joist and the hole saw ready to cut a corresponding opening in a construction panel for the cooperating collar.
Figure 25:
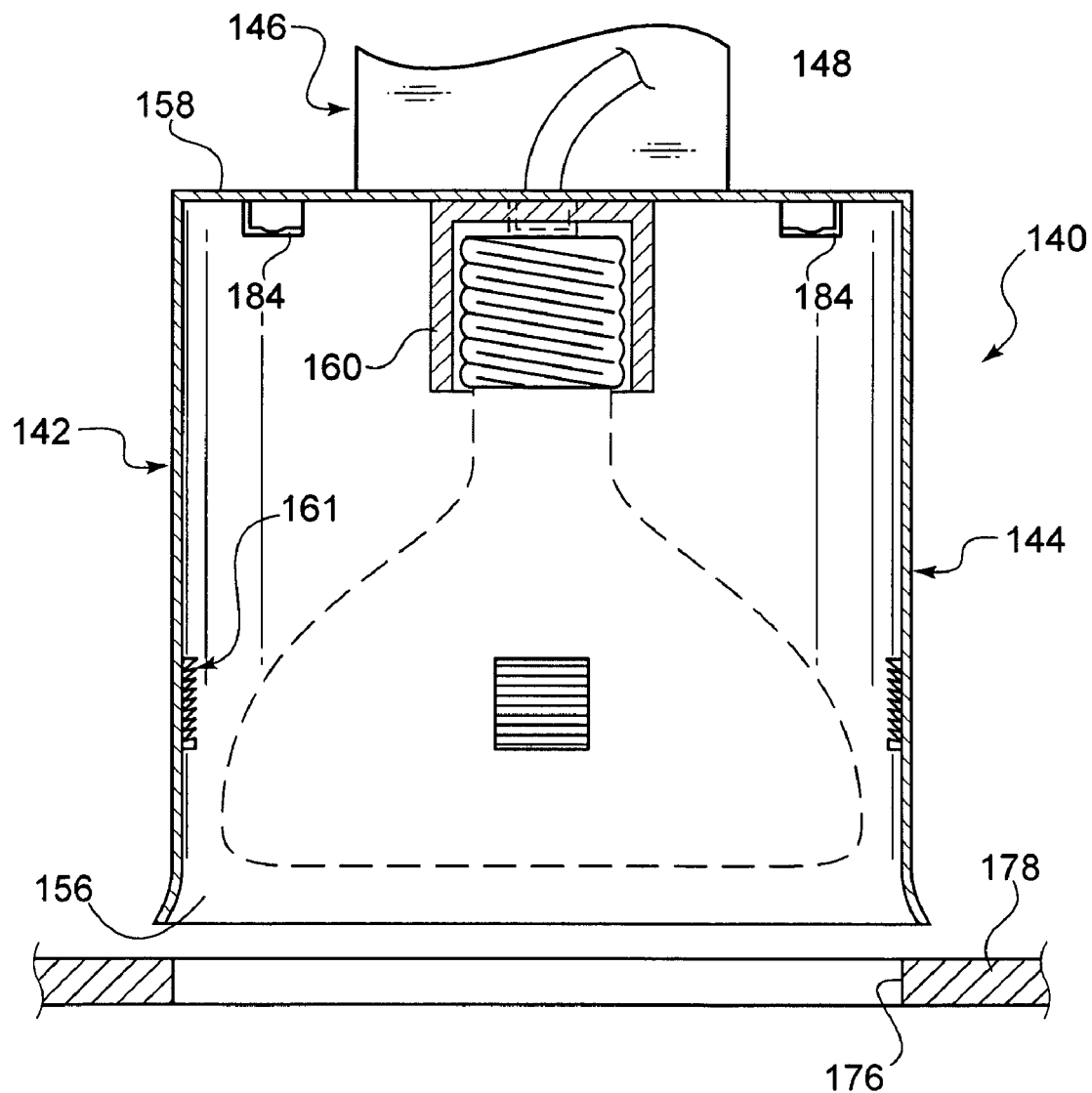
FIG. 25 is a diagrammatic cross-sectional view taken on line 25-25 of FIG. 21, but showing the construction panel having the corresponding opening therethrough.
Figure 26:
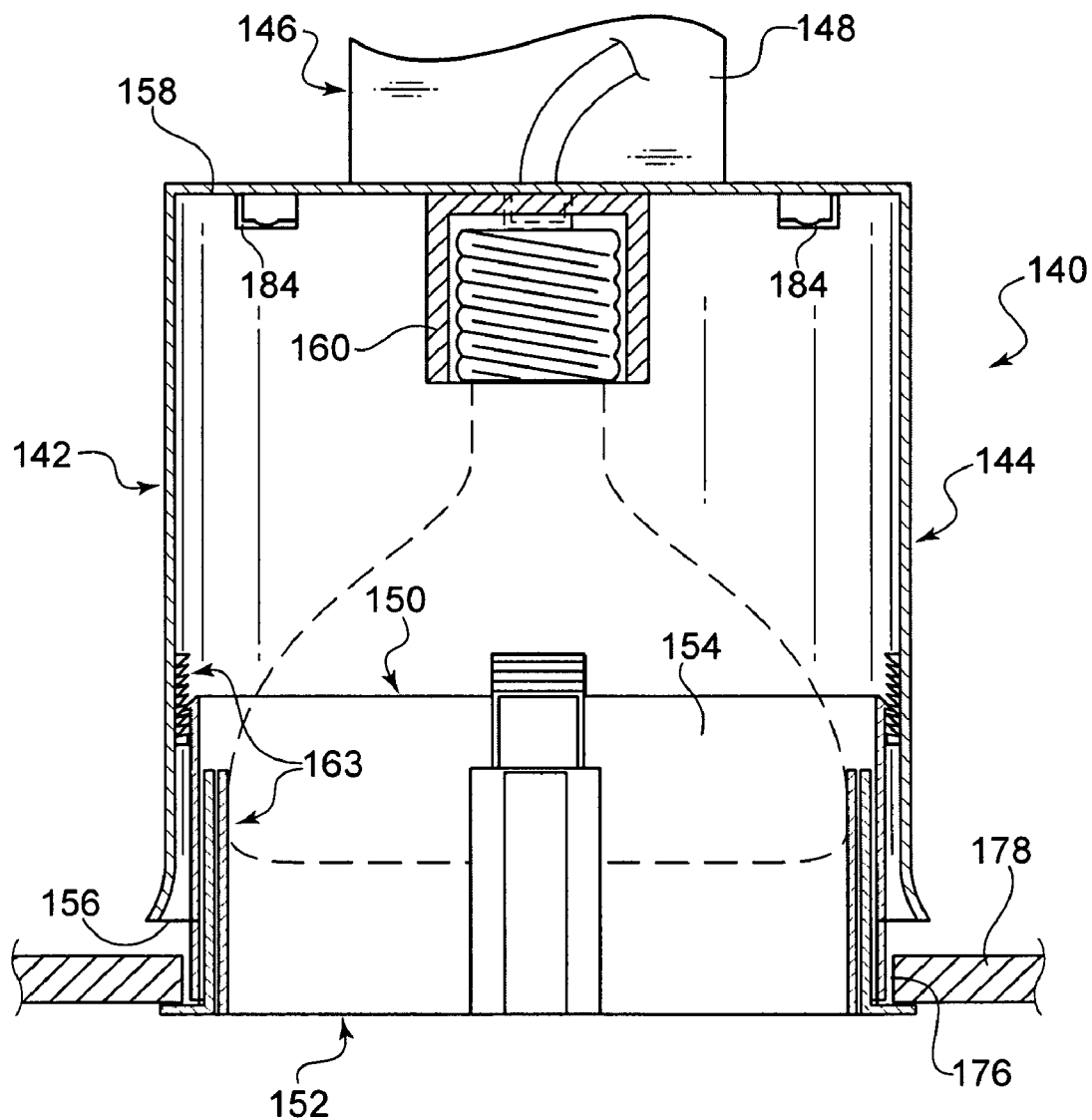
FIG. 26 is a diagrammatic cross-sectional view showing the housing and collar of the second embodiment in an assembled position.

FIGS. 21 through 26 are a diagrammatic perspective view, with parts broken away, of a housing being a cylindrical top hat light component of a second embodiment of the present invention; a diagrammatic perspective view of a cooperating collar of the second embodiment; a diagrammatic perspective view of a cooperating placement jig for securement in the housing of the second embodiment and a hole saw; a diagrammatic cross-sectional view taken on line 24-24 of FIG. 23, but also showing the housing connected to a typical ceiling joist and the hole saw ready to cut a corresponding opening in a construction panel for the cooperating collar; a diagrammatic cross-sectional view taken on line 25-25 of FIG. 21, but showing the construction panel having the corresponding opening therethrough; and a diagrammatic cross-sectional view showing the housing and collar of the second embodiment in an assembled position, and as such, will be discussed with reference thereto.

The second embodiment of the present invention is a second electrical fixture 140, wherein a housing 142 comprises a cylindrical top hat light component 144 which will be mounted to a stationary building structure 146 that is a ceiling joist 148. A back portion 150 of a collar 152 comprises a cylindrical shaped member 154 that is configured to fit into a front aperture 156 in the cylindrical top hat light component 144. The cylindrical top hat light component 144 further comprises a back wall 158 having an integral light socket 160 thereon. A locking mechanism 163 is similar to the locking mechanism 44 in the first embodiment. A placement jig 162 comprises a cylindrical tubular member 164 having a open top end 166 sized to be placed against the back wall 158 of the cylindrical top hat light component 144 and about the integral light socket 160. A cylindrical portion 167 is integral with a closed bottom end 168 of the cylindrical tubular member 164. The cylindrical portion 167 has a through bore 170 therein to receive a shaft 172 of a hole saw 174 to cut a corresponding opening 176 in a construction panel 178. The construction panel 178 can be a ceiling-board fabricated out of plastic, plasterboard, wood, metal or any other durable material.

A removably securing mechanism comprises a plurality of male tabs 182, each integral with and horizontally extending outwardly in spaced apart relationship from the open top end 166 of the cylindrical tubular member 164. A plurality of female seats 184 are each integral with and extend downwardly from the back wall 158 and about the integral light socket 160 of the cylindrical top hat light component 144. When the open top end 166 of the cylindrical tubular member 164 is rotated in one direction against the back wall 158 of the cylindrical top hat light component 144 the male tabs 182 will engage with the female seats 184. When the cylindrical tubular member 164 is rotated in an opposite direction the male tabs 182 will disengage from the female seats 184.

Accordingly the installation of the second electrical fixture 140 can now be finally completed by inserting, through the construction panel 178, the second electrical fixture collar 152, into the front aperture 156 of the housing of the second electrical fixture 142.

It will be understood that each of the elements described above, or two or more together, may also find a useful application in other types of constructions differing from the types described above.

While the invention has been illustrated and described as embodiments of an electrical fixture for facilitating the location of a corresponding opening in a construction panel, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An electrical fixture for facilitating the location of a corresponding opening in a construction panel which comprises:
   A) a housing for mounting to a stationary building structure behind the corresponding opening in the construction panel; and
   B) a collar having a back portion which fits through the corresponding opening in the construction panel and into said housing, further comprising means for locking said back portion of said collar within said housing, wherein said locking means comprises:
   a) at least one rack member formed in said housing;
   b) at least one spring biased pawl arm integrally formed in said back portion of said collar;
   c) at least one track assembly formed on said back portion of said collar over said at least one spring biased pawl arm; and
   d) at least one L-shaped lever arm that slides in said at least one track assembly which causes said at least one spring biased pawl arm to engage with and disengage from said at least one rack member.

2. The electrical fixture as recited in claim 1, further comprising:
   a) a placement jig having a cylindrical portion extending centrally therefrom; and
   b) means for removably securing said placement jig within said housing, wherein said cylindrical portion will extend outwardly from said housing.

3. The electrical fixture as recited in claim 2, wherein said housing comprises a junction box which will be mounted to the stationary building structure that is a wall stud.

4. The electrical fixture as recited in claim 3, wherein said back portion of said collar comprises a box-shaped member that is configured to fit into a front aperture in said junction box.

5. The electrical fixture as recited in claim 4, wherein said junction box further comprises a vertical frame-like wall formed in a spaced relationship behind said front aperture.

6. The electrical fixture as recited in claim 5, wherein said placement jig comprises:
   a) a rectangular mounting plate having a central internally threaded hub on a rear surface thereof and a rear stepped edge thereabout, wherein said rear stepped edge of said rectangular mounting plate will be placed against said vertical frame-like wall in said junction box; and
   b) said cylindrical portion having a reduced externally threaded circular back end and a knurled front end, wherein said reduced externally threaded circular back end threads into said central internally threaded hub of said rectangular mounting plate.

7. The electrical fixture as recited in claim 6, wherein removably securing means comprises:
   a) a pair of knurled knobs, with each said knurled knob having a shaft rotatably extending through a top front corner surface and through a bottom front corner surface of said rectangular mounting plate diagonally opposite from each other; and
   b) a pair of flange members, with each said flange member affixed to a free end of each said shaft, wherein when said rear step edge of said rectangular mounting plate is placed against said vertical frame-like wall in said junction box, said knurled knobs will be manually rotated with said two flanges extending behind said vertical frame-like wall to hold said rectangular mounting plate in place thereto.

8. The electrical fixture as recited in claim 7, further comprising a locating template which cooperates with said cylindrical portion of said placement jig extending through a small preliminary opening in the construction panel.

9. The electrical fixture as recited in claim 8, wherein said locating template comprises:
   a) a rectangular outline plate having a central cylindrical aperture there through which fits onto said cylindrical portion of said placement jig, wherein said rectangular outline plate is of a size that matches the size of said box-shaped member of said back portion of said collar; and
   b) a level vial mounted parallel in a front surface of said rectangular outline plate near a top edge thereof, wherein said level vial will properly position said rectangular outline plate against the construction panel, in which the small preliminary opening in the construction panel will be enlarged to the size of said box-shaped member of said back portion of said collar by marking said rectangular outline plate on the construction panel and cutting out the outline on the construction panel.

10. The electrical fixture as recited in claim 8, wherein said locating template comprises:
   a) a guide plate having a central rectangular aperture there through, which matches the size of said box-shaped member of said back portion of said collar;
   b) a bracket having a central cylindrical aperture there through which fits onto said cylindrical portion of said placement jig;
   c) means for removably holding said bracket on a front surface of said guide plate and over said central rectangular aperture;
   d) a level vial mounted parallel in said front surface of said guide plate near a top edge thereof, wherein said level vial will properly position said guide plate against the construction panel; and
   e) means for removably retaining said guide plate in a stationary position against the construction panel, wherein when said bracket and said cylindrical portion of said placement jig are removed therefrom, the small preliminary opening in the construction panel will be enlarged to the size of said box-shaped member of said back portion of said collar, by cutting out a portion of the construction panel about said central rectangular aperture in said guide plate.

11. The electrical fixture as recited in claim 10, wherein said removably holding means comprises a pair of bracket securement arms, in which each said bracket securement arm is pivotally mounted on said front surface of said guide plate at one side of said bracket.

12. The electrical fixture as recited in claim 11, wherein said removably retaining means comprises a pair of knurled knobs, with each said knurled knob having a threaded screw shaft rotatably extending through a top front corner surface and through a bottom front corner surface of said guide plate diagonally opposite from each other, wherein when said knurled knobs are manually rotated said threaded screw shafts will thread into the construction panel to hold said guide plate in place thereto.

13. The electrical fixture as recited in claim 2, wherein said housing comprises a cylindrical top hat light component which will be mounted to the stationary building structure that is a ceiling joist.

14. The electrical fixture as recited in claim 13, wherein said back portion of said collar comprises a cylindrical shaped member that is configured to fit into a front aperture in said cylindrical top hat light component.

15. The electrical fixture as recited in claim 14, wherein said cylindrical top hat light component further comprises a back wall having an integral light socket thereon.

16. The electrical fixture as recited in claim 15, wherein said placement jig comprises;
   a) a cylindrical tubular member having a open top end sized to be placed against said back wall of said cylindrical top hat light component and about said integral light socket; and
   b) said cylindrical portion integral with a closed bottom end of said cylindrical tubular member, wherein said cylindrical portion having a through bore therein to receive a shaft of a hole saw to cut the corresponding opening in the construction panel.

17. The electrical fixture as recited in claim 16, wherein said removably securing means comprises:
   a) a plurality of male tabs, each integral with and horizontally extending outwardly in spaced apart relationship from said open top end of said cylindrical tubular member; and
   b) a plurality of female seats each integral with and extend downwardly from said back wall and about said integral light socket of said cylindrical top hat light component, wherein when said open top end of said cylindrical tubular member is rotated in one direction against said back wall of said cylindrical top hat light component said male tabs will engage with said female seats, and when said cylindrical tubular member is rotated in an opposite direction said male tabs will disengage from said female seats.

* * * * *